(12) United States Patent
Honda et al.

(10) Patent No.: US 6,313,612 B1
(45) Date of Patent: Nov. 6, 2001

(54) ELECTRONIC DEVICE, ELECTRONIC DEVICE TO BE CHARGED AND METHOD OF CONTROLLING ELECTRONIC DEVICES

(75) Inventors: Katsuyuki Honda; Motomu Hayakawa, both of Shiojiri; Tsukasa Kosuda, Matsumoto, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/700,699
(22) PCT Filed: Mar. 21, 2000
(86) PCT No.: PCT/JP00/01706
§ 371 Date: Jan. 9, 2001
§ 102(e) Date: Jan. 9, 2001
(87) PCT Pub. No.: WO00/55956
PCT Pub. Date: Sep. 21, 2000

(30) Foreign Application Priority Data

Mar. 18, 1999 (JP) ................................. 11-074423

(51) Int. Cl.$^7$ .................................. H01M 10/46
(52) U.S. Cl. ............................................. 320/139
(58) Field of Search .................................. 320/127, 128, 320/129, 130, 139, 141, 145

(56) References Cited

U.S. PATENT DOCUMENTS 3,663,938 * 5/1972 Baer .
3,886,427 * 5/1975 Long .
5,691,623 * 11/1997 Tsantilis .
5,713,939 * 2/1998 Nedungadl et al. .

FOREIGN PATENT DOCUMENTS

| 0 580 350 A2 | 1/1994 | (EP) . |
| 0 862 257 A2 | 9/1998 | (EP) . |
| 6-113474 | 4/1994 | (JP) . |
| 9-103037 | 4/1997 | (JP) . |
| 9-322422 | 12/1997 | (JP) . |

* cited by examiner

Primary Examiner—Edward H. Tso

(57) ABSTRACT

An electronic unit for charging a unit to be charged having an accumulator section which can be repeatedly charged has a charging section for charging the accumulator section according to a charging control signal and a charging control section. The charging control section monitors a battery voltage (or a charging current), and maintains an effective charging period per unit time for a long term when the battery voltage (or the charging current) of an accumulator battery is lower than a limit voltage (or the charging current corresponding to the limit voltage) selected in advance. After the battery voltage (or the charging current) reaches the limit voltage (or the charging current corresponding to the limit voltage), however, the charging control section reduces the effective charging period per unit time.

21 Claims, 18 Drawing Sheets

(a) When Command is Received (b) When No Command is Received

Indication A

| Full Charging Finished | —104

Indication B

| Timepiece Not Placed | —104

Indication C

| Charging Finished | —104

Indication D

| Data Transfer Finished | —104

FIG. 15

ELECTRONIC DEVICE, ELECTRONIC DEVICE TO BE CHARGED AND METHOD OF CONTROLLING ELECTRONIC DEVICES

BACKGROUND OF THE INVENTION

1. Technical Field

The present invention relates to electronic units, electronic units to be charged, and control methods for electronic units. More particularly, the present invention relates to an electronic unit which charges a portable electronic unit, an electronic unit to be charged which is a portable electronic unit to be charged, and a control method for an electronic unit which charges a portable electronic unit.

2. Background Art

Compact, portable electronic units (electronic units to be charged), such as portable communication terminals and electronic timepieces, which are placed in a charging unit called a station and charged have recently become known. Some compact, portable electronic units which can be charged have lithium-ion secondary batteries as accumulators for accumulating electric energy. Since lithium-ion secondary batteries have advantages of a high energy density and relatively low self-discharging, they are widely used especially for compact, portable electronic units which require a high energy density such as portable telephones, camcorders, and notebook personal computers.

If a voltage equal to or higher than a so-called limit voltage is applied to a lithium-ion secondary battery, dendrite (treelike crystal) is formed, an internal short-circuit occurs, and the life of the battery is reduced. Therefore, in a general charging method, constant-current charging is applied to a lithium-ion secondary battery until the charged voltage (voltage to which the battery is charged) reaches the limit voltage, and then constant-voltage charging is applied after the charged voltage reaches the limit voltage. Details of this charging method are described, for example, in Japanese Unexamined Patent Application Publication No. Hei-5-111184.

In this charging method, however, after the charged voltage reaches the limit voltage, although the consumed current hardly changes, since the charging current is drastically reduced, wasteful power consumption occurs. Since the temperature of the battery continues to rise due to a leakage current and due to the heat of the compact, portable electronic unit caused by the operation of a charging control circuit, the compact, portable electronic unit and the lithium-ion secondary battery may deteriorate.

DISCLOSURE OF THE INVENTION

Accordingly, it is an object of the present invention to provide an electronic unit, an electronic unit to be charged, and a control method for an electronic unit which reduce wasteful current consumed during charging.

According to one mode of the present invention, an electronic unit for charging a unit to be charged having an accumulator section which can be repeatedly charged may include a charging section for charging the accumulator section according to a charging control signal; and with a first effective charging time T1 serving as an effective charging time per unit time used when charging is achieved if the accumulated voltage of the accumulator section is lower than a reference voltage specified in advance and a second effective charging time T2 serving as an effective charging time per unit time used when charging is achieved if the accumulated voltage is equal to or higher than the reference voltage, which are specified in advance so as to satisfy an expression (1), a charging control section for outputting the charging control signal according to the first effective charging time T1, the second effective charging time T2, and the comparison result of the accumulated voltage of the accumulator section and the reference voltage.

$$T1 > T2 \qquad (1)$$

According to another mode of the present invention, an electronic unit for charging a unit to be charged having an accumulator section which can be repeatedly charged may include a charging section for applying pulse charging to the accumulator section according to a charging control signal; and with a first pulse count P1 used in the pulse charging per unit time in charging achieved if the accumulated voltage is lower than a reference voltage specified in advance and a second pulse count P2 used in the pulse charging per unit time in charging achieved if the accumulated voltage is equal to or higher than the reference voltage, which are specified in advance so as to satisfy an expression (2), a charging control section or outputting the charging control signal according to the first pulse count P1, the second pulse count P2, and the comparison result of the accumulated voltage of the accumulator section and the reference voltage.

$$P1 > P2 \qquad (2)$$

According to another mode of the present invention, an electronic unit for charging a unit to be charged having an accumulator section which can be repeatedly charged may include a charging section for charging the accumulator section according to a charging control signal; and with a first effective charging time T1 serving as an effective charging time per unit time used when charging is achieved if the charging current of the accumulator section is equal to or higher than a reference current specified in advance and a second effective charging time T2 serving as an effective charging time per unit time used when charging is achieved if the accumulation current is lower than the reference current, which are specified in advance so as to satisfy an expression (1), a charging control section for outputting the charging control signal according to the first effective charging time T1, the second effective charging time T2, and the comparison result of the accumulation current of the accumulator section and the reference current.

$$T1 > T2 \qquad (1)$$

According to another mode of the present invention, an electronic unit for charging a unit to be charged having an accumulator section which can be repeatedly charged may include a charging section for applying pulse charging to the accumulator section according to a charging control signal; and with a first pulse count P1 per unit time in charging achieved if the charging current of the accumulator section is equal to or higher than a reference current specified in advance and a second pulse count P2 per unit time in charging achieved if the accumulation current is lower than the reference current, which are specified in advance so as to satisfy an expression (2), a charging control section for outputting the charging control signal according to the first pulse count P1, the second pulse count P2, and the comparison result of the accumulation current of the accumulator section and the reference current.

$$P1 > P2 \qquad (2)$$

According to another mode of the present invention, an electronic unit to be charged which is charged by any of the foregoing electronic units may include an accumulator section which can be repeatedly charged; and an accumulated-voltage detecting and outputting section for detecting the accumulated voltage of the accumulator section and for outputting an accumulated-voltage detection result.

According to another mode of the present invention, an electronic unit to be charged which is charged by any of the foregoing electronic units may include an accumulator section which can be repeatedly charged; an accumulated-voltage detecting section for detecting the accumulated voltage of the accumulator section; and a comparison-result outputting section for comparing the accumulated voltage detected by the accumulated-voltage detecting section with a reference voltage specified in advance and for outputting the result of comparison.

According to another viewpoint of the present invention, a control method for an electronic device for charging an apparatus to be charged having an accumulator unit which can be repeatedly charged may include the steps of charging the accumulator unit; and with a first effective charging time T1 serving as an effective charging time per unit time used when charging is achieved if the accumulated voltage of the accumulator unit is lower than a reference voltage specified in advance and a second effective charging time T2 serving as an effective charging time per unit time used when charging is achieved if the accumulated voltage is equal to or higher than the reference voltage, which are specified in advance so as to satisfy an expression (1), controlling charging according to the first effective charging time T1, the second effective charging time T2, and the comparison result of the accumulated voltage of the accumulator unit and the reference voltage.

$$T1 > T2 \quad (1)$$

BRIEF DESCRIPTION OF THE DRAWINGS

In the drawings, wherein like reference symbols refer to like parts:

Various embodiments of the present invention will be described below by referring to the accompanying drawings. The accompanying drawings include the following:

FIG. 15 is a view showing various example indications on a display section of the station.

BEST MODE FOR CARRYING OUT THE INVENTION

Operation principle of lithium-ion secondary batteries and principle of embodiments Prior to specific descriptions of embodiments, the operation principle of lithium-ion secondary batteries and the principle of the present invention will be described below by referring to FIG. 1.

Figure 1:
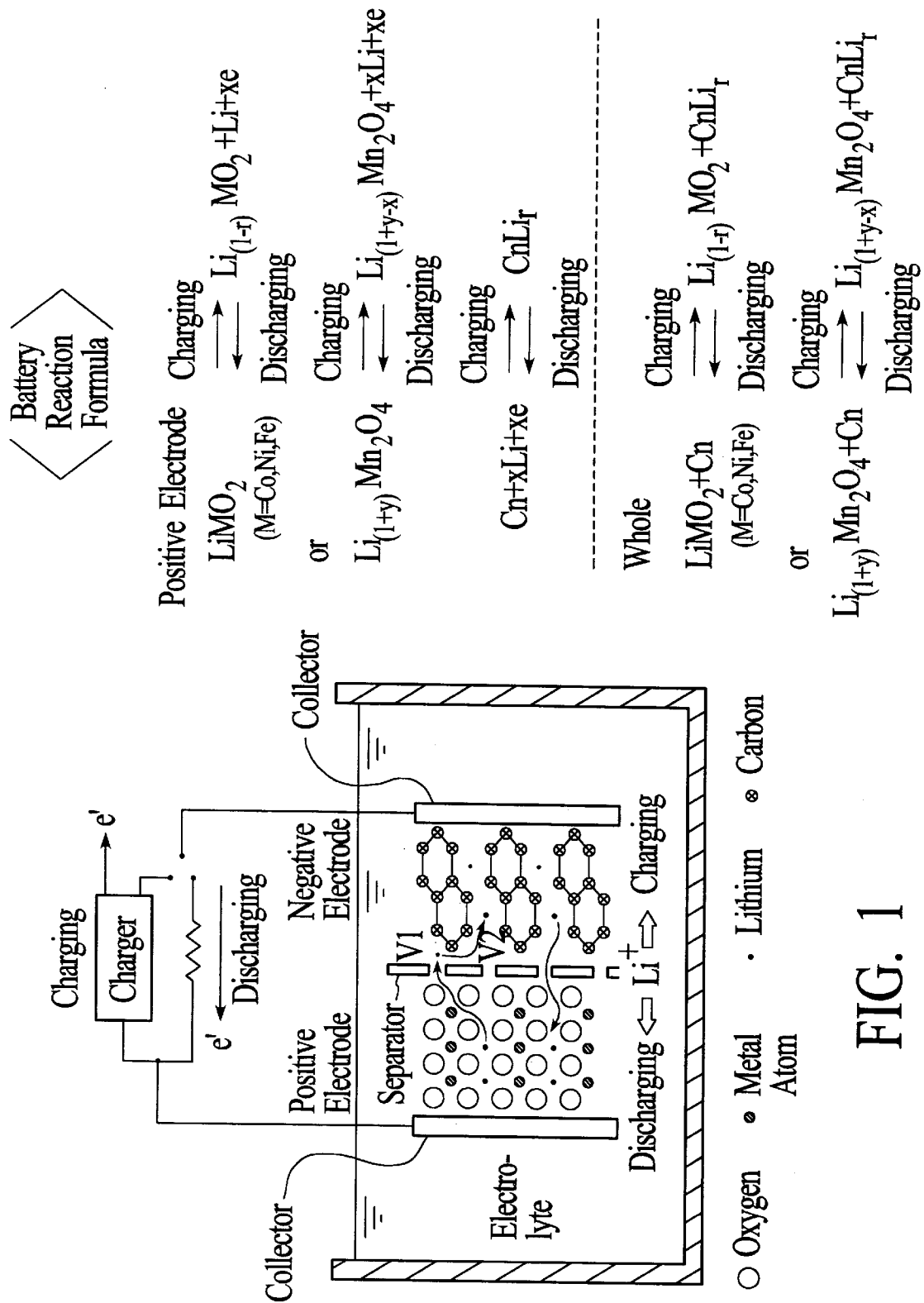
FIG. 1 is a view showing the operation principle of a lithium-ion secondary battery.

The charging and discharging operations and the battery reaction formula of lithium-ion secondary batteries are indicated in FIG. 1. Focusing on the behavior of lithium ions during charging, charging is executed in the following two stages.

First stage: A process (dissolution process) in which lithium (Li) dissolves in an organic electrolyte from a positive electrode to generate lithium ions ($Li^+$).

Second stage: A process (occlusion process) in which the lithium ions ($Li^+$) in the organic electrolyte enter (are inserted into) the layers of the graphitized-carbon material of a negative electrode and occluded.

Figure 2:
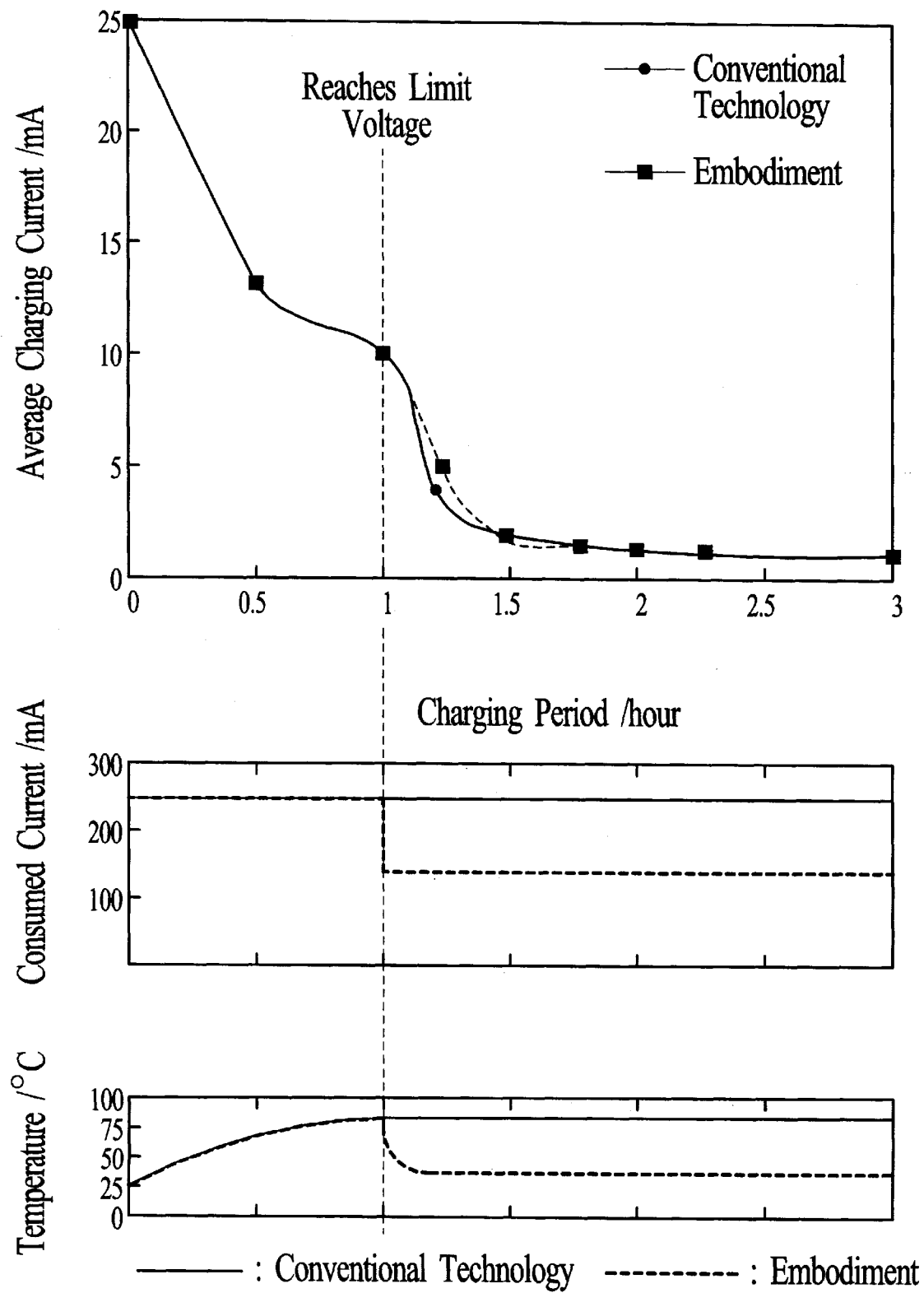
FIG. 2 is a view showing operation states in an embodiment of the present invention and a conventional case.

When the rate of progress of the dissolution process is called v1 and that of the occlusion process is called v2, v1≈v2 at an early stage of charging. After the charged voltage reaches the limit voltage of a lithium-ion secondary battery, v1>>v2. In other words, after the charged voltage reaches the limit voltage, the charging current is drastically reduced as shown in a chart indicating the change of the average charging current in FIG. 2. This is because lithium ions repel each other as the charged voltage of the lithium-ion secondary battery increases, and a nominal charging resistance increases to reduce the efficiency of charging. In the conventional charging method, the consumed current (and resultant, power consumption) is hardly changed, as indicated by a solid line in a chart illustrating the change of the consumed current in FIG. 2. Therefore, wasteful power consumption occurs. In addition, it is understood from a chart indicating the change of the temperature in FIG. 2 that the temperature of the battery continues to rise due to a leakage current and the heat of the compact, portable electronic unit caused by the operation of a charging control circuit. Therefore, the compact, portable electronic unit and the lithium-ion secondary battery may deteriorate.

Therefore, in the present embodiment, the battery voltage is monitored, and after the battery voltage of a lithium-ion secondary battery reaches a battery limit voltage selected in advance, an effective charging time is reduced so that the occlusion process is reliably performed.

Embodiment

An embodiment will be described below in detail. In the present embodiment, a station serves as an electronic unit which achieves charging and an electronic timepiece serves as a portable electronic unit, as an electronic unit to be charged, which is charged by the station. The present invention is not limited to this case, however.

Mechanical structure

Figure 3:
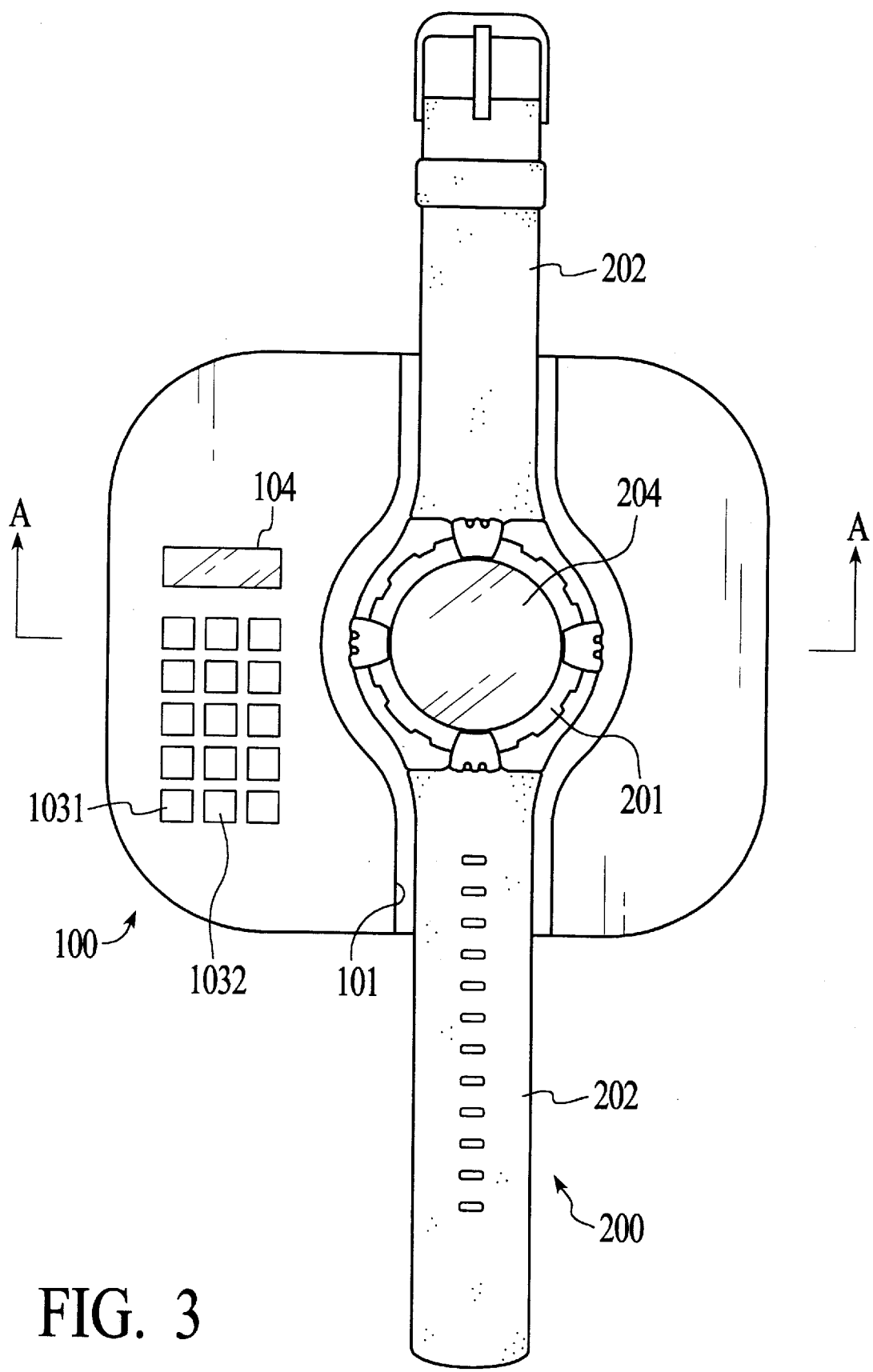
FIG. 3 is a plan showing the structures of a station and an electronic timepiece according to the embodiment of the present invention.

FIG. 3 is a plan of the station and the electronic timepiece according to the present embodiment. As shown in FIG. 3, the electronic timepiece 200 is placed in a dented portion 101 of the station 100 when the electronic timepiece 200 is charged or achieves data transfer. Since this dented portion 101 is formed so as to be slightly larger than the body 201 and the band 202 of the timepiece 200, the timepiece body 201 is appropriately positioned against the station 100.

The station 100 is provided with various input sections, such as a charging start button 1031 for instructing the start of charging and a transfer start button 1032 for instructing the start of data transfer, and a display section 104 for displaying various items. The timepiece 200 according to the present embodiment is usually worn on a wrist of a user, indicates the time and the date on the display section 204, and detects and stores medical information, such as a pulse rate and a heartbeat rate, at an interval of a constant period by a sensor and a processing section not shown.

Figure 4:
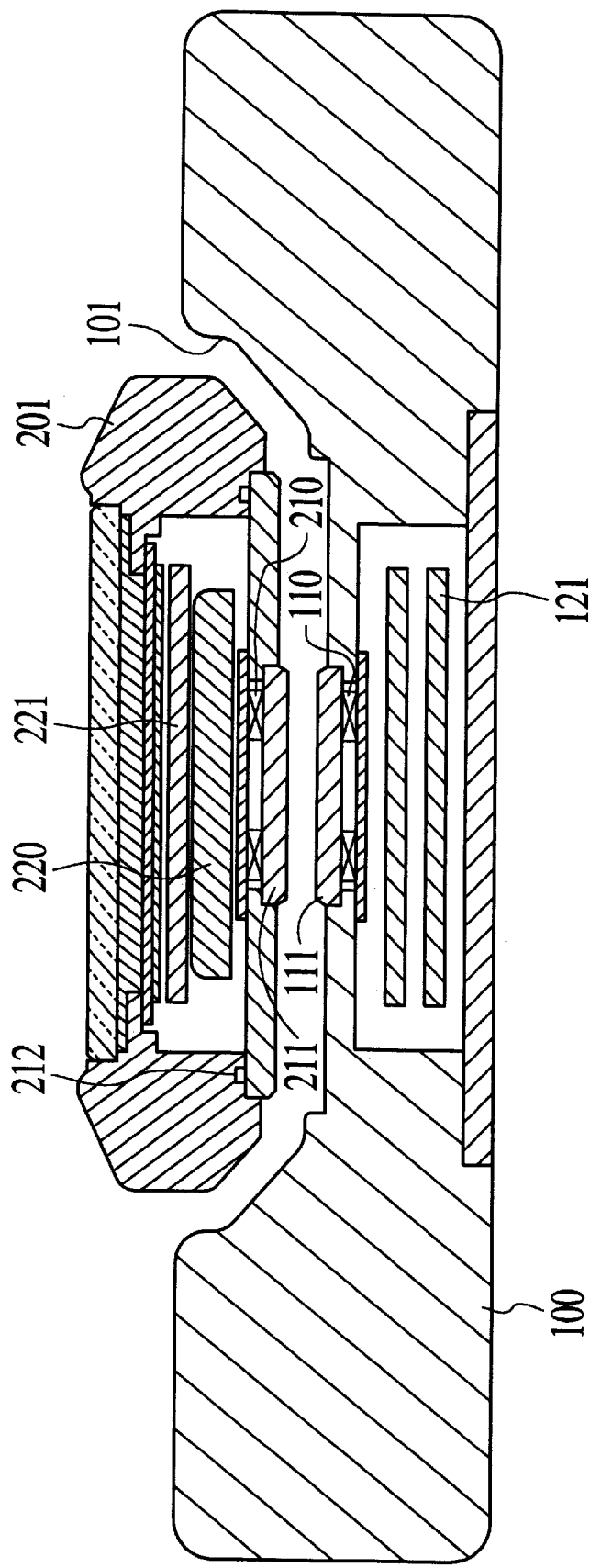
FIG. 4 is a cross-sectional view showing the structures of the station and the electronic timepiece.

FIG. 4 is a cross-sectional view taken on line A—A in FIG. 3. As shown in this figure, a cover glass 211 is mounted on the rear cover 212 of the body 201 of the timepiece. A timepiece coil 210 used for data transfer and charging is sandwiched between the cover glass 211 and the rear cover 212. The body 201 of the timepiece is provided with a secondary battery 220 and a circuit board 221 connected to the timepiece coil 210 in the inside of the body.

A station coil 110 is provided at a position opposite that of the timepiece coil 210 in the dented portion 101 of the station 100. The station coil 110 is sandwiched by a cover glass 111 and the body of the station. The station 100 includes a circuit board 121 in its inside. The circuit board 121 is connected to the coil 110, the charging start button 1031, the transfer start button 1032, the display section 104, and a primary power source (not shown).

When the electronic timepiece 200 is placed in the station 100, although the station coil 110 and the timepiece coil 210 do not physically contact due to the cover glasses 111 and 211, since the coil winding planes are almost parallel, they are electromagnetically coupled.

The station coil 110 and the timepiece coil 210 are of a hollow type having no magnetic core. This is to prevent a timepiece mechanical part from being magnetized, to prevent the weight of the timepiece from increasing, and to prevent a magnetic metal from being exposed. Therefore, when the present invention is applied to an electronic unit in which the above points do not cause a problem, a coil having a magnetic core may be used. When a signal having a sufficiently high frequency is applied to a coil, the coil does not need a core.

Electric structure

The electric structures of the station 100 and the electronic timepiece 200 will be described next.

Electric structure of Station

The structure of the station 100 will be described first by referring to FIG. 5.

Figure 5:
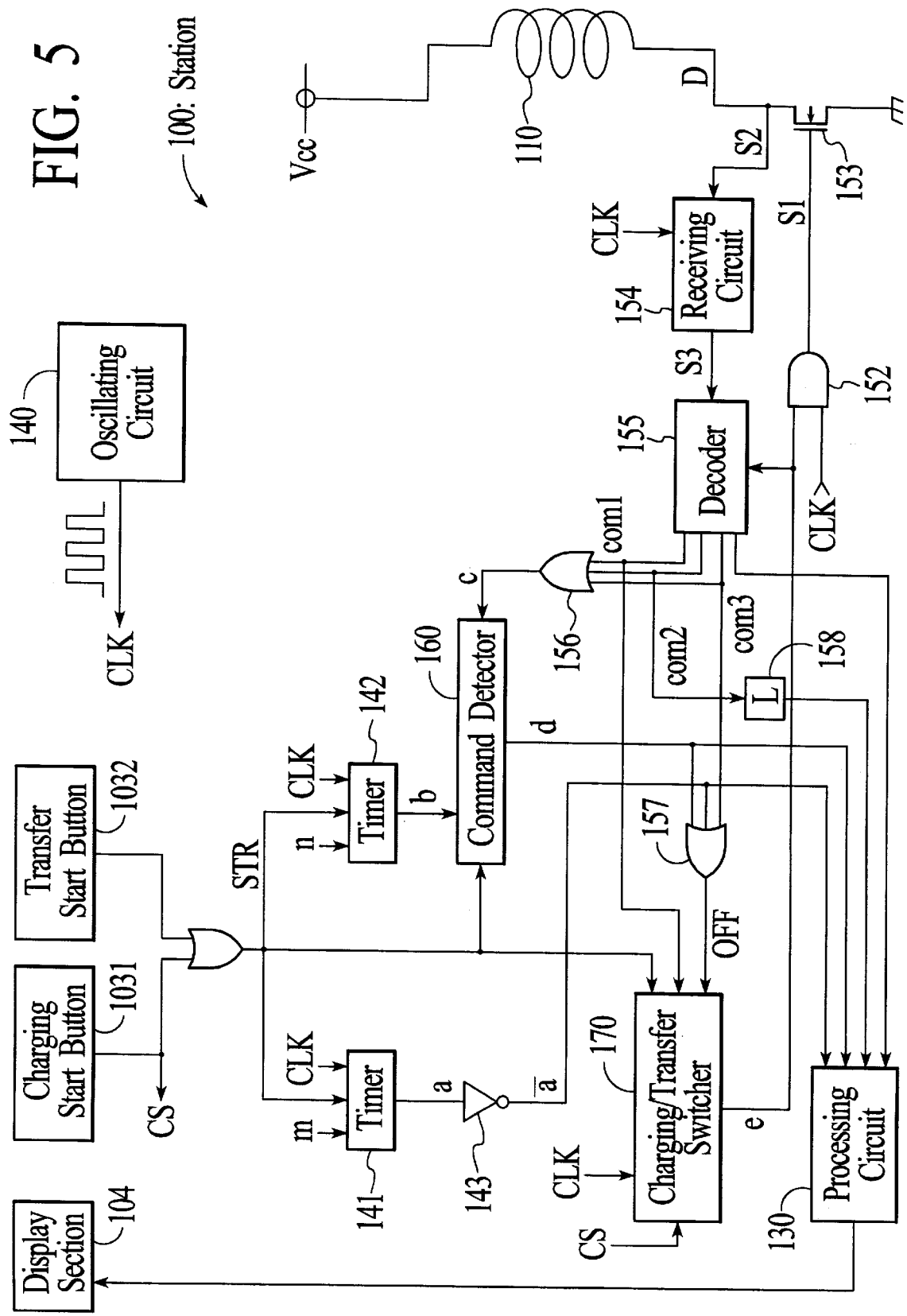
FIG. 5 is a block diagram showing the electric structure of the station.

As shown in FIG. 5, one terminal of the station coil 110 is pulled up to a power voltage Vcc, and the other terminal D is connected to the drain of a transistor 153. The gate of the transistor 153 is connected to the output of an AND gate 152 which receives a clock signal CLK at one input end. The source of the transistor 153 is grounded. The clock signal CLK is used for synchronizing the operations of various elements, and is generated by a oscillating circuit 140.

When the user presses the charging start button 1031 or the transfer start button 1032, a one-shot pulse signal is output. For the convenience of description, either of the pulse signals output when the buttons are pressed is called a pulse signal STR. The pulse signal output when the charging start button 1031 is pressed is called a pulse signal CS if it is necessary to clearly identify this signal.

When a timer 141 receives the pulse signal STR, the timer 141 starts decrementing (counting in reverse) a preset value "m" according to the clock signal CLK and outputs a signal "a" which has a high level during counting in reverse. The preset value "m" is set such that the high-level period of the signal "a" is, for example, 10 hours. In other words, the timer 141 outputs the signal "a" which has the high level only for 10 hours after the user presses the charging start button 1031 or the transfer start button 1032. The signal "a" is inverted in level by an inverter circuit 143 and sent to a second input end of an OR gate 157 and to a processing circuit 130.

When a timer 142 receives the pulse signal STR, the timer 142 starts decrementing (counting in reverse) a preset value "n" according to the clock signal CLK and outputs a signal "b" which has the high level during counting in reverse. The preset value "n" is sufficiently smaller than "m" and is set such that the high-level period of the signal "b" is, for example, 30 minutes. In other words, the timer 142 outputs the signal "b" which has the high level only for 30 minutes after the user presses one of the charging start button 1031 and the transfer start button 1032.

The set time of the timer 141 is enough for charging the secondary battery to a full-charged level. To finish charging even if a command "com3," described later, indicating full charging is not output from the electronic timepiece 200 for some reason after the charging start button 1031 or the transfer start button 1032 is pressed, the timer 141 monitors the set time.

The set time of the timer 142 indicates a period required from when the remaining electric charge of the battery is zero to when the battery has the amount of electric charges necessary for data transfer (system activation). The timer 142 detects a state in which the electronic timepiece 200 is placed in the station 100 but data transfer is impossible due to an insufficient amount of electric charges, or a state in which the electronic timepiece 200 is not placed in the station 100.

A command detector 160 outputs a signal "d" which has the high level when none of commands "com1" to "com3," described later, is received from the electronic timepiece 200 during a predetermined period (30 minutes after the pulse signal STR is received) for which the signal "b" has the high level. The command "com1" indicates that the voltage of a battery to be charged is equal to or lower than a limit voltage, which is a reference voltage, a command "com2" indicates that the voltage of the battery is less than the limit voltage, and the command "com3" indicates that the battery is fully charged. The signal "d" is sent to a first input end of the OR gate 157 and to the processing circuit 130. A detailed structure of the command detector 160 will be described later.

A charging/transfer switcher 170 sends a pulse signal "e" to a decoder 155 and to the AND gate 152. The charging/transfer switcher 170 outputs a first charging signal having a duty cycle of 20/21 shown in FIG. 6 as the pulse signal "e" during a period in which the output signal OFF of the OR gate 157 has a low level, after the charging/transfer switcher 170 receives the pulse signal STR. The charging/transfer switcher 170 outputs a second charging signal having a small duty cycle (½) shown in FIG. 6 as the pulse signal "e" when the charging/transfer switcher 170 receives the pulse signal CS, which indicates that the charging start button 1031 was pressed, and a signal "com1," which indicates that the station 100 has received the command "com1," described later, from the electronic timepiece 200. The charging/transfer switcher 170 keeps the signal "e" at the low level when the signal OFF goes high.

The AND gate 152 outputs a signal S1 having a level based on that of the clock signal CLK to the transistor 153 in a period in which the signal "e" output from the charging/transfer switcher 170 has the high level. Therefore, the transistor 153 is periodically switched on and off between the drain and the source according to the change of the level of the clock signal CLK during the period in which the signal "e" has the high level. As a result, the power voltage Vcc is applied to the station coil 100 periodically. Therefore, a pulse signal is applied and a magnetic field is generated to charge the electronic timepiece 200.

During the period when the signal "e" has the low level, since the AND gate 152 is closed, the station coil 110 is pulled up to the power voltage Vcc. In this state, when the timepiece coil 210 generates an external magnetic field, a signal S2 is induced at a terminal D of the station coil 110. A receiving circuit 154 receives the signal S2. The receiving circuit 154 demodulates the signal S2 by using the clock signal CLK. A detailed structure thereof will be described later. The result of demodulation is sent to the decoder 155. The decoder 155 decodes the result of demodulation achieved by the receiving circuit 154 during the period when the signal "e" has the low level.

Therefore, charging is executed during the period when the signal "e" has the high level, and data is transferred from the electronic timepiece to the station during the period when the signal "e" has the low level. In other words, the charging/transfer switcher 170 has a function for switching between charging and data transfer.

Signals sent from the electronic timepiece 200 include medical information data, such as a pulse rate and a heartbeat rate, in addition to the commands "com1" to "com3," described later. The decoder 155 sends signals indicating medical information to the processing circuit 130. When the decoder receives any of the commands "com1" to "com3," the decoder 155 sets the output signals "com1" to "com3" corresponding to the commands "com1" to "com3" to the high level to inform each element that the command has been received. When any of the signals "com1" to "com3" has the high level, the OR gate 156 outputs a signal "c." Therefore, the signal "c" functions as a signal indicating that any of the commands "com1" to "com3" has been received from the electronic timepiece 200.

The signal "com1," which indicates that the result of decoding is the command "com1," is sent to the charging/transfer switcher 170.

The signal "com2," which indicates that the result of decoding is the command "com2," is sent to the processing circuit 130 through a latch circuit 158. The processing circuit 130 controls contents displayed on the display section 104 according to an input signal and a decoded medical-information signal.

The signal "com3," which indicates that the result of decoding is the command "com3," is sent to a third input end of the OR gate 157. The OR gate 157 sends the signal OFF to the charging/transfer switcher 170. When any of signals input into the three ends of the OR gate 157 is high, the signal OFF becomes high. The signal "d" is sent from the command detector 160 to the first input end of the OR gate 157. The signal obtained by inverting the signal "a" output from the timer 141 in level is sent to the second input end of the OR gate 157. The signal "com3," which indicates the result of decoding is the command "com3," is sent to the third input end of the OR gate 157. Therefore, when any of the following three conditions is satisfied, the signal OFF becomes high, and the charging/transfer switcher 170 sets the signal "e" from the high level to the low level to terminate charging.

First condition: None of the commands "com1" to "com3" is received from the electronic timepiece 200 until 30 minutes elapse after the signal STR is output when the charge start button 1031 or the transfer start button 1032 is pressed.

Second condition: Ten hours elapse after charging starts.

Third condition: The command "com3" is received from the electronic timepiece 200.

Command detector

Figure 7:
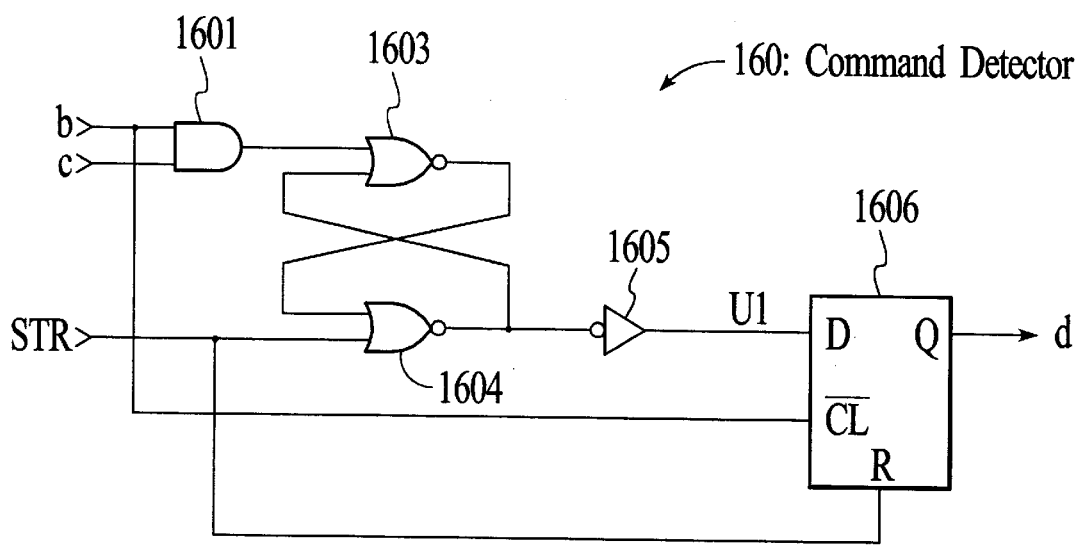
FIG. 7 is a block diagram showing the structure of a command detector in the station.

The structure of the command detector 160 will be described next by referring to FIG. 7. An AND gate 1601 outputs the logical AND of the signal "b" and the signal "c." An RS flip-flop having NOR gates 1603 and 1604 receives the logical AND of the AND gate 1601 as an R signal (reset signal), and also receives the signal STR as an S signal (set signal). An inverter circuit 1605 inverts the output of the NOR gate 1604 and sends it as a signal U1 to the D input end of a D flip-flop 1606. The D flip-flop 1606 is reset by the signal STR, and starts outputting the level at the input end D obtained immediately before the rising edge of the signal "b" as a signal "d" at the falling edge of the signal "b."

Figure 8:
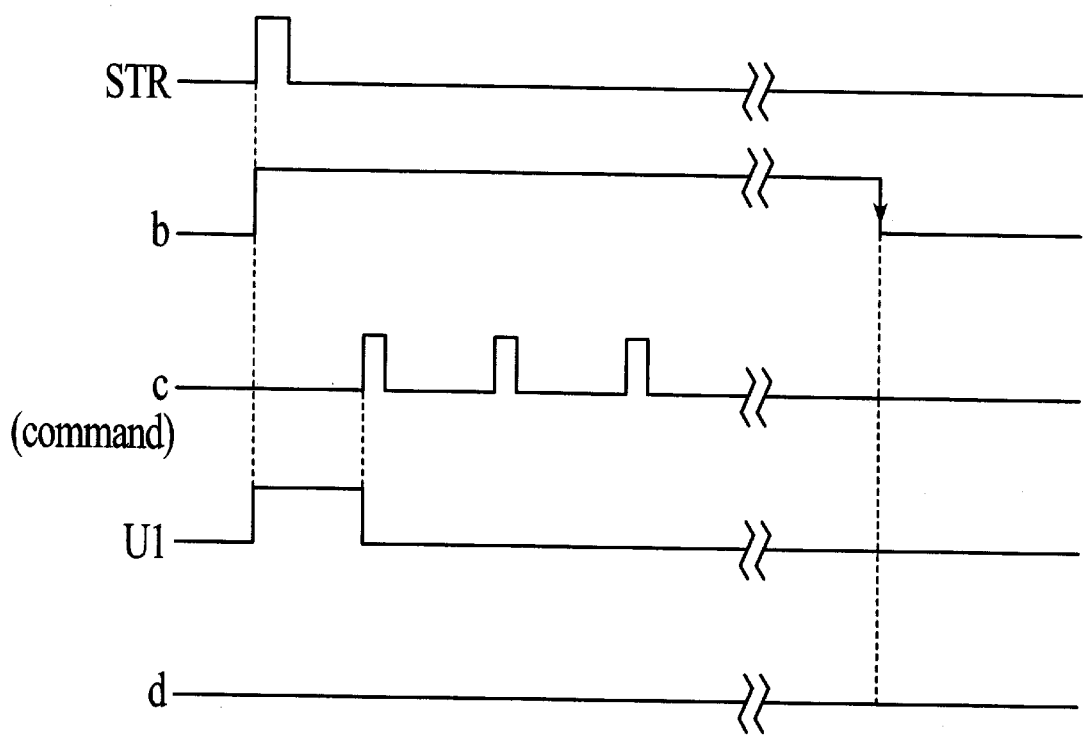
FIG. 8 is a timing chart showing the operation of the command detector.
Figure 8:
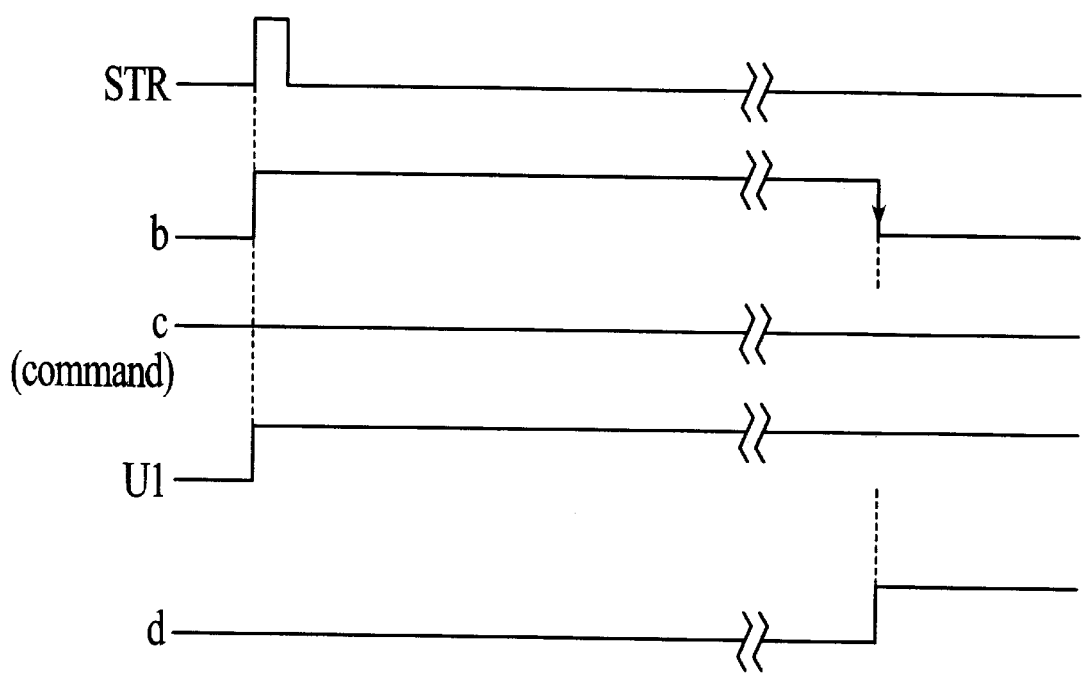

When the user presses the charging start button 1031 or the transfer start button 1032, the one-shot pulse signal STR is output, for example, as shown in FIG. 8. Since the output of the NOR gate 1604 becomes low by the signal STR, the signal U1 becomes high and the timer 142 (shown in FIG. 5) starts counting. Therefore, the signal "b" has the high level for a predetermined period, as shown in FIG. 8.

When the decoder 155 shown in FIG. 5 receives any of the commands "com1" to "com3" from the electronic timepiece 200, the received command is output in a pulse manner during the period when the signal "e" has the low level.

In this case, when the signal "b" and the signal "c" both become high and their logical AND becomes high, the output of the NOR gate 1604 comes to have the high level. Therefore, as shown in (a) of FIG. 8, the signal U1 is set low and this level is maintained thereafter. Consequently, at a point of time when (to be precise, immediately before) the signal "b" falls after a predetermined period of time elapses after the one-shot pulse signal STR is output, the signal "d" output from the output end "Q" of the D flip-flop 1606 is kept at the low level.

When the decoder 155 receives none of the commands "com1" to "com3" from the electronic timepiece 200, the signal "c" is maintained at the low level as shown by (b) in FIG. 8. Therefore, since the signal U1 is maintained at the high level, the signal "d" output from the output end "Q" of the D flip-flop 1606 is set to the high level at a point of time when the signal "b" falls after the predetermined period of time elapses after the pulse signal STR is output.

As described above, during the predetermined period until 30 minutes elapse after the pulse signal STR is received, the command detector 160 sets the signal "d" to the high level after the period elapses if any of the commands "com1" to "com3" is received from the electronic timepiece 200, and maintains the signal "d" at the low level when none of the commands is received.

Receiving circuit

Figure 9:
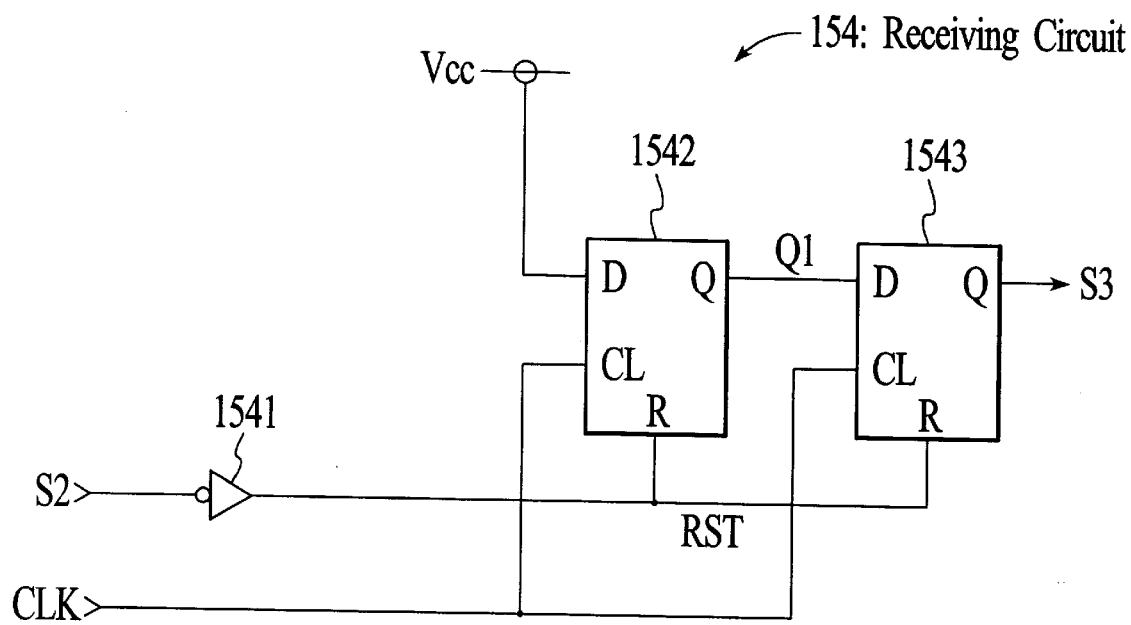
FIG. 9 is a circuit diagram of an example receiving circuit in the station.

A structure of the receiving circuit 154 will be described next by referring to FIG. 9. The structure shown in the figure is just an example. Another structure may be used according to a modulation method used for data transfer.

The signal S2, induced at the other terminal D of the station coil 110, is inverted in level and waveform-shaped by an inverter circuit 1541 and is sent to D flip-flops 1542 and 1543 synchronizing with the clock signal CLK of the oscillating circuit 140 (shown in FIG. 5), as a reset signal RST. The input end D of the D flip-flop 1542 is connected to the power voltage Vcc, and its output end "Q" is connected to the input end D of the next-stage D flip-flop 1543. A signal S3 serving as the result of demodulation is output from the output end "Q" of the D flip-flop 1543.

Figure 10:
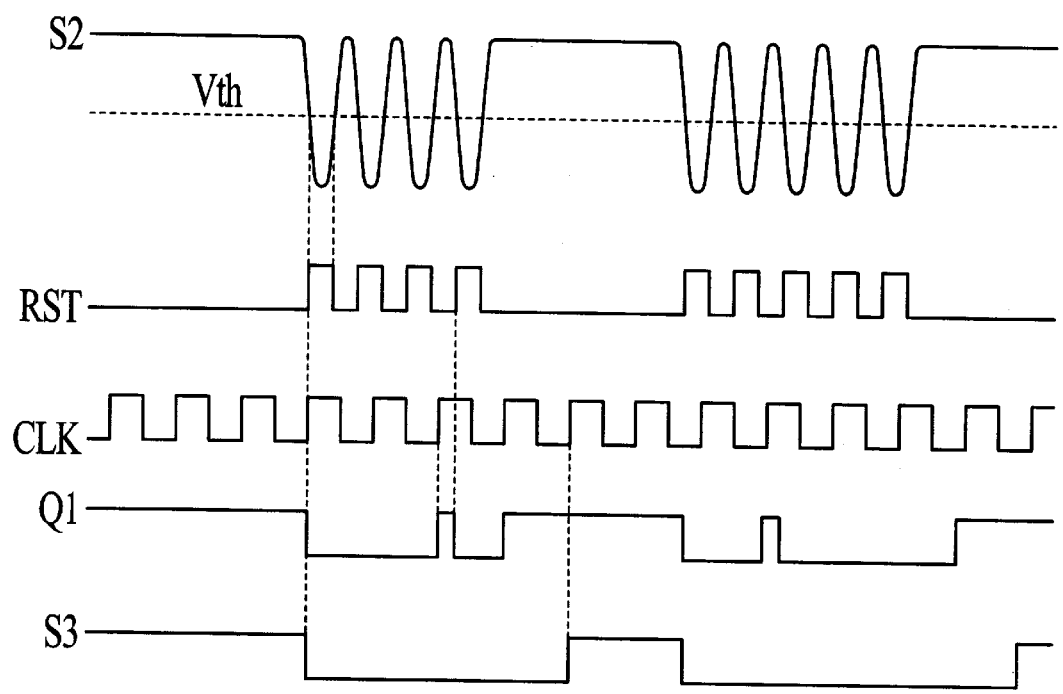
FIG. 10 is a timing chart showing the operation of the receiving circuit.

The waveform of each part in the receiving circuit 154 having the above structure will be described next. When data is received from the electronic timepiece 200, since the transistor 153 (shown in FIG. 5) is not switched, the other terminal D of the pulled-up station coil 110 has a pull-up level if the timepiece coil 210 does not generate an external magnetic field. If an external magnetic field is generated, the terminal D has a level induced according to the magnetic field. Therefore, the signal S2, induced at the terminal D, is changed, for example, as shown in FIG. 10.

The signal RST, the output of the inverter 1541, goes high when the voltage of the signal S2 is lower than a threshold Vth, and resets the D flip-flops 1542 and 1543. In this case, at the rising edge of the clock signal CLK, since the D flip-flops 1542 and 1543 output the levels of the input ends D obtained immediately before the rising edge, the output Q1 of the D flip-flop 1542 and the output S3 of the D flip-flop 1542 are changed as shown in FIG. 10. In other words, the output signal S3 of the receiving circuit 154 has the low level during a period when the timepiece coil 210 generates an external magnetic field.

The period when the timepiece coil 210 generates an external magnetic field is a period when the electronic timepiece 200 sends low-level data to the station 100. Therefore, it is understood that the signal S3 is obtained by demodulating data and a command sent from the electronic timepiece 200.

Electric structure of electronic timepiece

Figure 11:
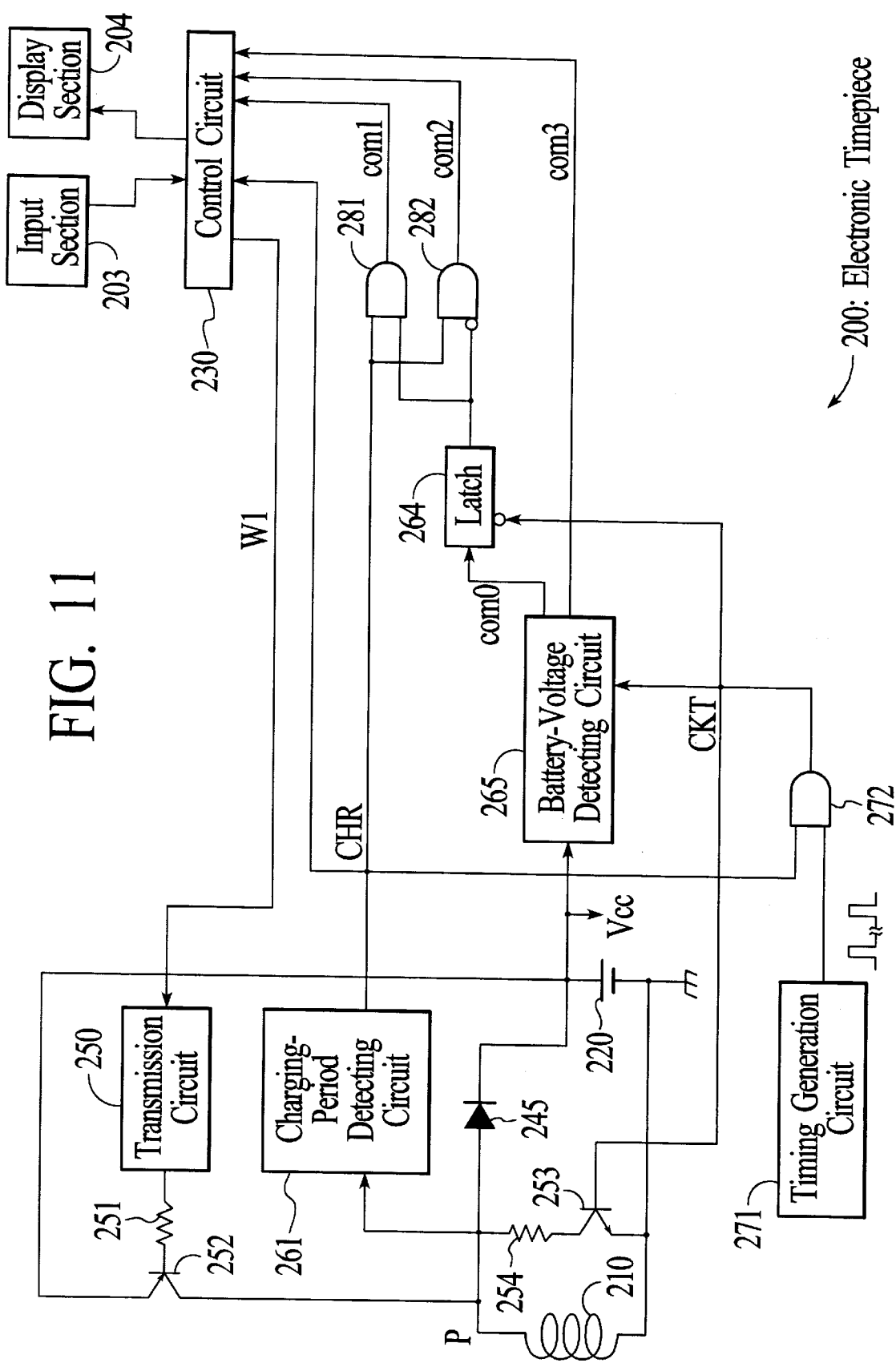
FIG. 11 is a block diagram showing the electric structure of the electronic timepiece.

The electrical structure of the electronic timepiece 200 will be described next. FIG. 11 is a structural block diagram of the electronic timepiece 200.

As shown in FIG. 11, one terminal P of the timepiece coil 210 is connected to a positive-side terminal of the secondary battery 220 through a diode 245, and the other terminal of the coil 210 is connected to the negative-side terminal of the secondary battery 220. Therefore, when a pulse signal is applied to the station coil 110 (shown in FIG. 5) and an external magnetic field is generated, a signal is induced at the terminal P of the timepiece coil 210 by the external magnetic field. The induced signal is rectified by the diode 245 when the transistor 253 is off and is sent to the secondary battery 220. The secondary battery 220 is thus charged. The secondary battery 220 is used as a power source for each element in the electronic timepiece 200, and applies the voltage Vcc to each element.

Figure 12:
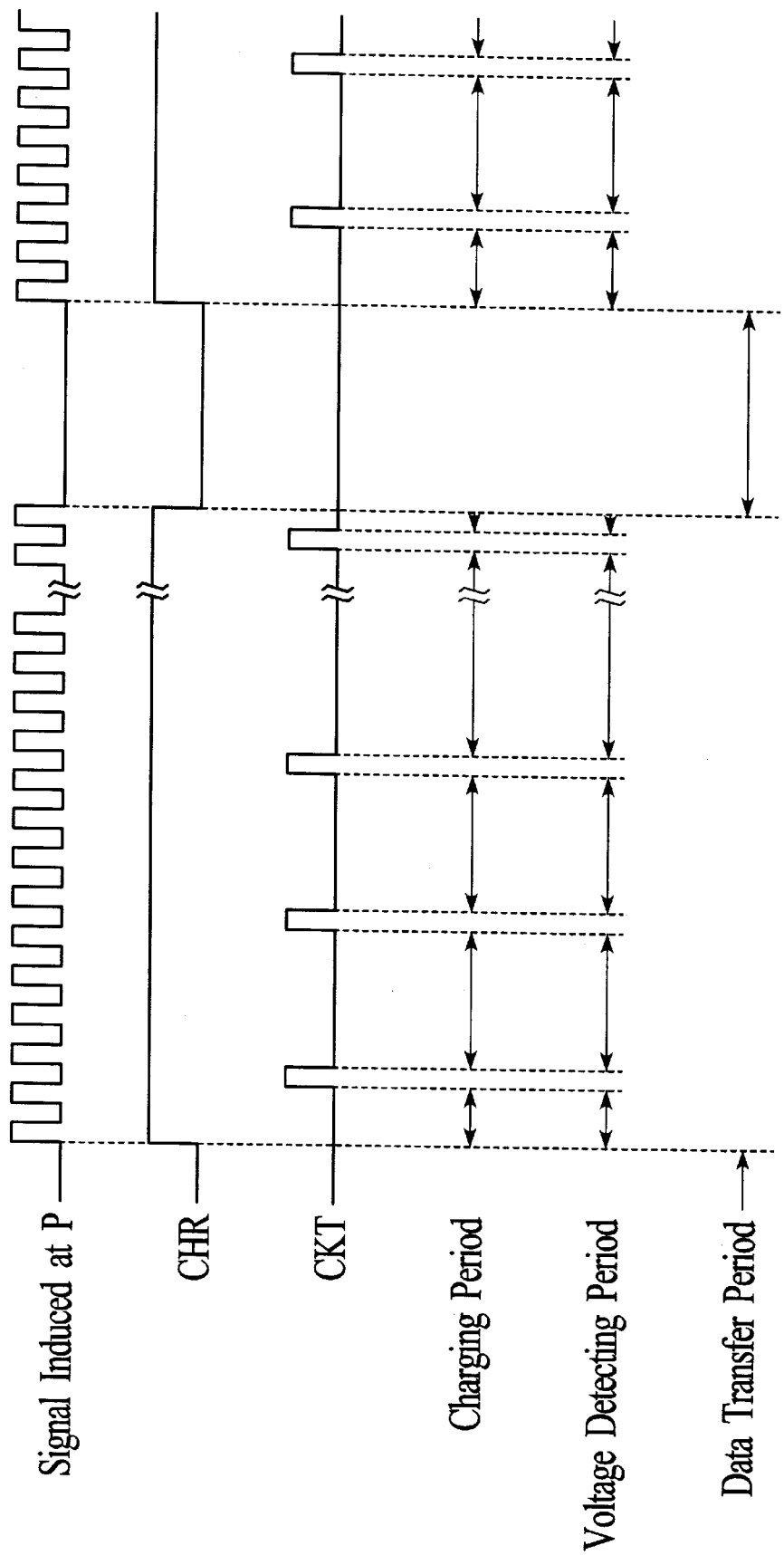
FIG. 12 is a timing chart showing the operation of the electronic timepiece.

A charging-period detecting circuit 261 determines whether a signal is induced at the terminal P by an external magnetic field. When a signal is induced at the terminal P as shown in FIG. 12, the charging-period detecting circuit 261 outputs a signal CHR having the high level.

A timing generation circuit 271 generates a pulse having a predetermined width at an interval of a predetermined period, and sends it to one input end of an AND gate 272. Since the signal CHR is sent from the charging-period detecting circuit 261 to the other input end of the AND gate 272, the AND gate 272 is closed when a signal is induced at the terminal P by an external magnetic field. Therefore, as shown in FIG. 12, the signal CKT of the AND gate 272 has pulses each having a predetermined width and output at an interval of a predetermined period while a signal is induced at the terminal P.

This signal CKT is sent to the base of a transistor 253. The collector of the transistor 253 is connected to the terminal P through a resistor 254, and the emitter thereof is grounded. Therefore, when the signal CKT is high, the transistor 253 is turned on between the collector and the emitter.

When the transistor 253 is on, the potential of the collector is changed due to the voltage drop across the resistor 254 according to a current flowing through the timepiece coil 210. In other words, the higher the current flows through the timepiece coil 210, the lower the potential level of the collector is.

A latch circuit 264 latches a signal "com0" output from a battery-voltage detecting circuit 265, described later, at the falling edge of the signal CKT. In other words, the determination result of whether the battery voltage of the secondary battery 220 determined during a period when the transistor 253 is on exceeds a reference value determined in advance, namely, whether the battery voltage of the secondary battery 220 exceeds a limit voltage, is output from the latch circuit 264.

An AND gate 281 obtains the logical AND of the signal CHR output from the charging-period detecting circuit 261 and the latch result of the latch circuit 264, and outputs the signal "com1" having the high level when both input signals are high.

An AND gate 282 obtains the logical AND of the signal CHR output from the charging-period detecting circuit 261 and the result of inversion of the latch result of the latch circuit 264, and outputs the signal "com2" having the high level when both input signals are high.

The battery-voltage detecting circuit 265 detects the terminal voltage of the secondary battery 220 during a period in which the signal CKT is low (in which the transistor 253 is off) as an accumulator-voltage detecting section. The battery-voltage detecting circuit 265 also determines as a comparison-result output section whether the battery voltage of the secondary battery 220 exceeds the limit voltage. When the result of determination is affirmative, the battery-voltage detecting circuit 265 outputs the signal "com0" having the high level. The battery-voltage detecting circuit 265 further determines whether the secondary battery 220 is in a completely charged state (full charged state). When the result of determination is affirmative, the battery-voltage detecting circuit 265 outputs the signal "com3" having the high level.

The signal "com1" having the high level means that a signal is induced at the terminal P and the battery voltage of the secondary battery 220 is equal to or more than the reference value, that is, the limit voltage (this corresponds to the signal "com0" having the high level). In this case, charging should be achieved with the duty cycle of the charging signal being reduced, that is, with the use of the second charging signal shown in FIG. 6.

The signal "com2" having the high level means that a signal is induced at the terminal P and the battery voltage of the secondary battery 220 is lower than the reference value, that is, the limit voltage (this corresponds to the signal "com0" having the low level). In this case, charging should be achieved with the duty cycle of the charging signal being increased, that is, with the use of the first charging signal shown in FIG. 6.

The signal "com3" having the high level means that the secondary battery 220 is in the full charged state and does not need to be charged any more.

A control circuit 230 is a kind of a central-processing control apparatus provided with a time-measurement function, and mainly achieves the following processing. The control circuit 230 has a first function in which an item (such as the current time) is displayed on the display section 204 according to the mode specified by an input section 203 (not shown in FIG. 3); a second function in which the state indicated by any of the signals "com1" to "com3" is recognized and the command corresponding to the recognized state, which is any of the commands "com1" to "com3," is generated when a signal is induced at the terminal P and the signal CHR goes high, and the generated command is output when the signal CHR goes low; and a third function in which digital data to be transmitted to the station 100 is output after any of the commands "com1" to "com3" is output. The control circuit 230 sends the commands "com1" to "com3" and the digital data to a transmission circuit 250 as W1. The digital data to be transmitted to the station 100 is expected to include medical information such as a beat rate and a heartbeat rate measured by a sensor not shown.

The transmission circuit 250 makes data and a command to be transmitted to the station 100 serial, and outputs a switching signal obtained by bursting a signal having a constant frequency during a period in which the serial data is low. The switching signal output from the transmission circuit 250 is sent to the base of a transistor 252 through a resistor 251. The collector of the transistor is connected to the positive-side terminal of the secondary battery 220, and the emitter of the transistor is connected to the one terminal P of the coil 210.

Therefore, in the electronic timepiece 200 having the above structure, when a signal is induced at the terminal P as shown in FIG. 12, the signal CHR is high and the signal CKT is output while the signal is being induced.

As shown in FIG. 12, when a signal is induced at the terminal P and the signal CKT is low, the secondary battery 220 is charged. Within the same period, the terminal voltage of the secondary battery 220 obtained when the signal CKT is low (when the transistor 253 is off) is detected.

In addition, as shown in FIG. 12, when a signal is not induced at the terminal P, that is, when the signal CHR is low, the commands "com1" to "com3" and digital data are transferred.

Transfer operation of commands and digital data

The transfer operation of commands and digital data in the station 100 and the electronic timepiece 200 will be described next. As described above, the electronic timepiece 200 is charged when the signal "e" is high. The transfer operation is achieved when the signal "e" is low.

In the period in which the signal "e" is low, a pulse signal is not applied to the station coil 110. Therefore, an external magnetic field is not generated by the station coil 110. Since a signal is not induced at the terminal P of the timepiece coil 210, the signal CHR is low. When the signal CHR is low, the control circuit 230 outputs any of the commands "com1" to "com3" and then sends data to be transmitted to the station 100 to the transmission circuit 250. Signal transmission from the electronic timepiece 200 to the station 100 thus starts.

When the data to be transmitted to the station 100 is high, the transmission circuit 250 outputs a high-level signal. When the data to be transmitted is low, the transmission circuit 250 outputs a signal obtained by bursting the pulse signal having a constant frequency. Therefore, the transistor 252 is switched in the period when the data to be transmitted is high.

Consequently, the pulse signal is applied to the timepiece coil 210 in the period when the data to be transmitted to the station 100 is low, and thereby an external magnetic field is generated.

By this external magnetic field, a signal having the same period as the pulse signal is induced at the terminal D of the station coil 110. Since the signal S3 is made low by the receiving circuit 154 having the above structure in the period when the signal is induced, and the signal S3 is high otherwise, the station 100 obtains the signal S3 by demodulating the digital data W1 sent from the electronic timepiece 200. The decoder 155 decodes the signal S3. When the result of decoding indicates digital data such as medical information, the data is sent to the processing circuit 130. When the result of decoding indicates any of the commands "com1" to "com3," the corresponding signal, which is any of the signal "com1" to "com3," is output.

In this way, the station 100 obtains commands and digital data sent from the electronic timepiece 200.

Charging and data transfer operations

Figure 13:
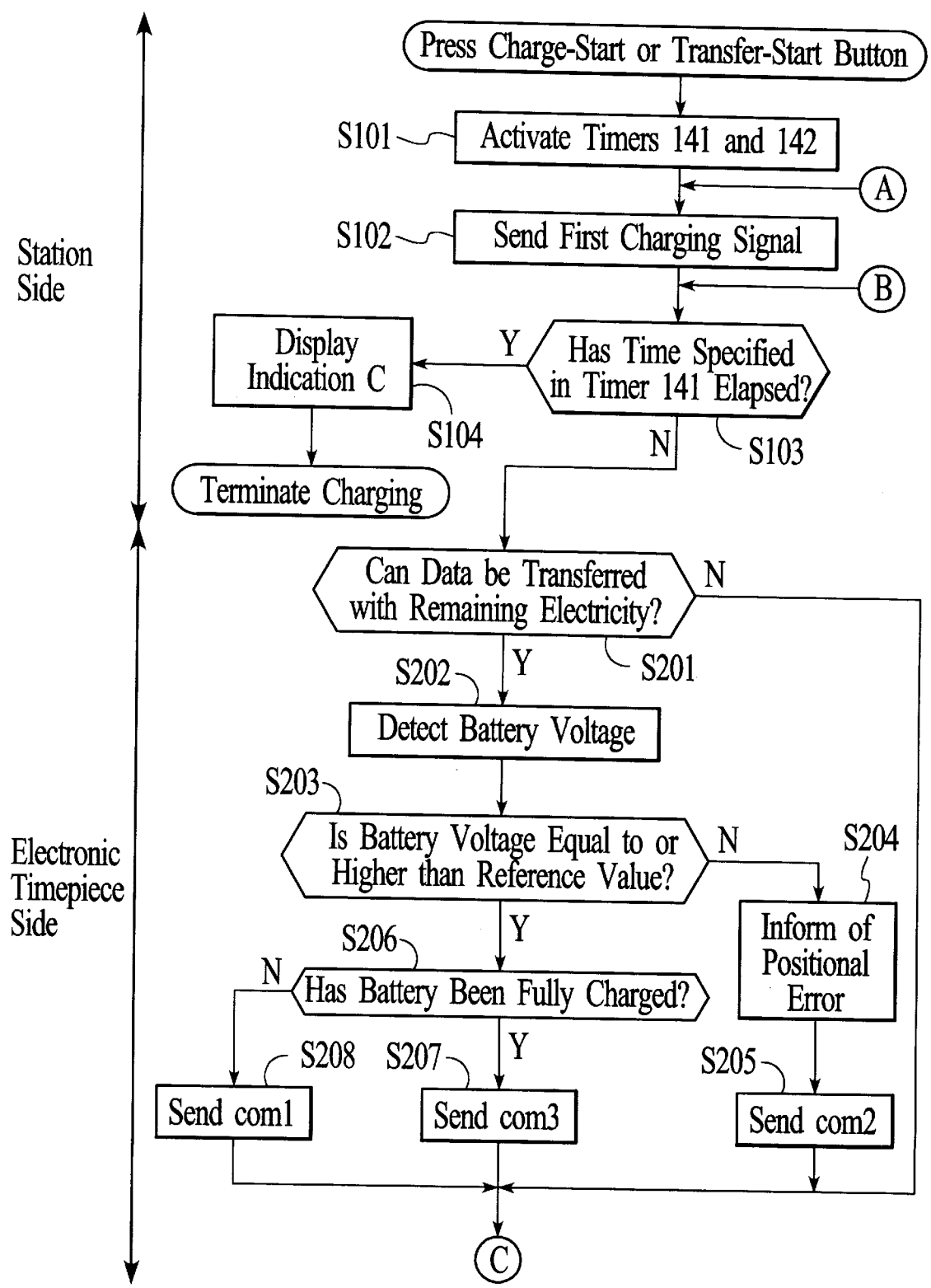
FIG. 13 and FIG. 14 illustrate a flowchart showing charging and data transfer operations executed between the station and the electronic timepiece.
Figure 14:
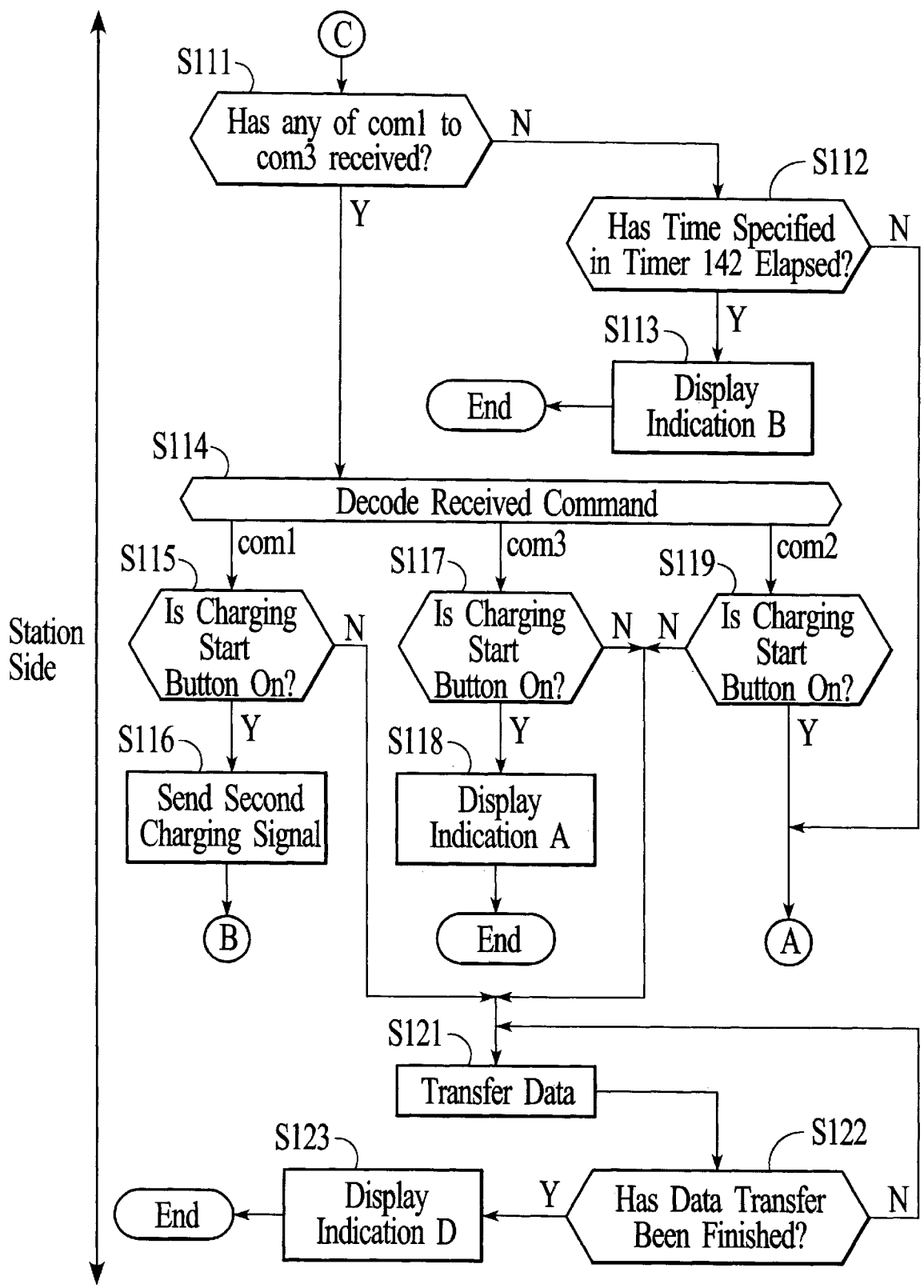

The charging and data transfer operations achieved in the station 100 and the electronic timepiece 200 will be described next by referring to the block diagrams shown in FIG. 5 and FIG. 11 and a flowchart shown in FIG. 13 and FIG. 14.

First, the user places the electronic timepiece 200 in the dented portion 101 of the station 100. With this operation, the station coil 110 and the timepiece coil 210 face each other as shown in FIG. 4, and electromagnetically coupled.

Then, when the user presses the charging start button 1031 or the transfer start button 1032, the timer 141 and the timer 142 start counting due to the pulse signal STR (step S101). The charging/transfer switcher 170 outputs the first charging signal shown in FIG. 6 as the signal "e." (step S102).

Next, it is determined by the inverted signal of the signal "a" whether the timer 141 has finished counting (step S103). When the counting operation has been finished, it means that 10 hours or more has elapsed after the charging start button 1031 or the transfer start button 1032 was pressed.

As described above, since the time specified by the timer 141 is sufficient for charging the secondary battery 220 to the full charged state, charging should be finished in a usual case by the receiving of the command "com3," which indicates the full charged state, before the specified time elapses. If the time specified by the timer 141 elapses irrespective of the above theory, it means that an error occurs such as a malfunction of the secondary battery 220.

Therefore, the processing circuit 130 indicates that charging processing has been finished, as shown by an indication C of FIG. 15, on the display section 104 to inform the user of the condition (step S104). Since the signal OFF goes high due to the inverted signal of the signal "a," the charging/transfer switcher 170 maintains the signal "e" at the low level. Consequently, if an error occurs, charging of the electronic timepiece 200 is terminated.

When the timer 141 has not yet finished counting, the charging/transfer switcher 170 continues outputting the signal "e." As a result, the station coil 110 generates an external magnetic field due to the switching of the transistor 153 in the period when the signal "e" is high, and the station coil 110 is idle in the period when the signal "e" is low, to receive a command sent from the electronic timepiece 200.

When an external magnetic field is generated due to the switching of the transistor 153, a signal is induced at the terminal P in the electronic timepiece 200. If the secondary battery 220 has a small amount of remaining electricity at the current time (if the determination result in a step S201 is negative), since each element does not operate, the subsequent steps S201 to S208 cannot be executed, and a command is not sent to the station 100.

When the secondary battery 220 has a sufficient amount of remaining electricity (when the determination result in the step S201 is affirmative), the battery voltage of the secondary battery 220 is detected (step S202) and it is determined whether the battery voltage detected by the battery-voltage detecting circuit 265 is equal to or more than a reference voltage (limit voltage of the secondary battery) determined in advance (step S203) during the period in which the signal CHK is low, that is, during the period in which the transistor 253 is off.

When it is determined in the step S203 that the battery voltage of the secondary battery 220 is less than the reference value (that the determination result in the step S203 is negative), since charging has not yet finished and the battery voltage has not yet reached the limit voltage, the command "com2" is sent to inform the station 100 of the condition (step S205).

When it is determined in the step S203 that the battery voltage of the secondary battery 220 is equal to or more than the reference voltage, namely, the limit voltage (that the determination result in the step S203 is affirmative), the battery-voltage detecting circuit 265 further determines whether the secondary battery 220 has been fully charged (step S206).

When the secondary battery 220 has been fully charged, since it corresponds to the signal "com3" having the high level, the secondary battery does not need to be charged any more, as described above. Therefore, the control circuit 230 sends the command "com3" to inform the station 100 of the condition (step S207).

Figure 6:
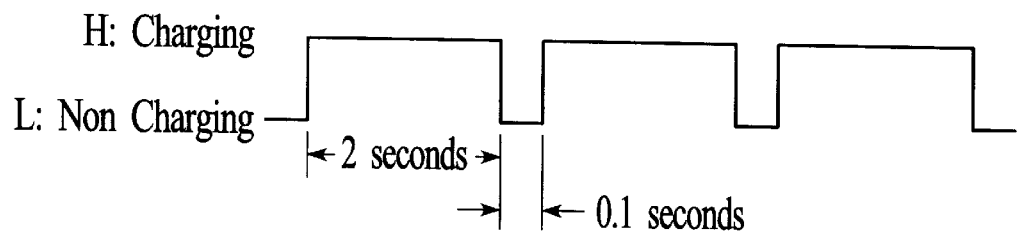
FIG. 6 is a view showing the waveforms of first and second charging signals passing through the same route but generated in different conditions in the station.
Figure 6:
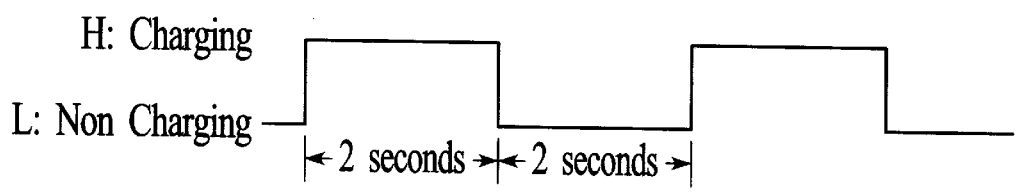

If the secondary battery 220 has not been fully charged, since it corresponds to the signal "com1" having the high level, the duty cycle of the charging signal should be reduced, that is, charging should be executed with the second charging signal, shown in FIG. 6. More specifically, it is necessary to give a sufficient time to the occlusion process. The control circuit 230 sends the command "com1" to inform the station 100 of the condition (step S208).

The commands "com1" to "com3" are sent during the period in which a signal is not induced at the terminal P, that is, during 10 seconds when the signal "e" is low in the station 100 and during the period when the signal CHR is low in the electronic timepiece 200.

As described above, when a signal is induced at the terminal P in the electronic timepiece 200, the magnitude of the battery voltage and the charging state of the secondary battery 220 are determined. Any of the commands "com1" to "com3" corresponding to the determined condition is sent to the station 100 during the period when a signal is not induced at the terminal P.

The station 100 executes charging with the first charging signal at least for 30 minutes, which is the operation period of the timer 142. Therefore, even if the second battery 220 is not ready to transfer data and none of the commands "com1" to "com3" is sent from the electronic timepiece 200, since the secondary battery 220 is charged for 30 minutes, it is charged such that data transfer is allowed.

In other words, when 30 minutes elapse after the electronic timepiece 200 is placed in the station 100 and the charging start button 1031 or the transfer start button 1032 is pressed, the secondary battery 220 becomes ready to transfer data and any of the commands "com1" to "com3" is sent.

Therefore, if no command is sent to the station 100, it means that the electronic timepiece 200 is not placed in the station 100.

The station 100 which is in the idling state determines whether any of the commands "com1" to "com3" has been received from the electronic timepiece 200 (step S111). If none of the commands "com1" to "com3" has been received, it is determined whether the timer 142 has finished counting (step S112). More specifically, the command detector 160 determines whether the signal "c" goes high during the period when the signal "b" is high.

Even if the timer 142 has finished counting, if none of the commands "com1" to "com3" has been received, the electronic timepiece 200 is not placed in the station 100, as described above, which is a case in which the signal "d" output from the command detector 160 is high.

Therefore, when the signal "d" goes high, the processing circuit 130 shows a warning indication on the display section 104, such as that indicating that the electronic timepiece is not placed, as shown in an indication B in FIG. 15, (step S113) to inform the user of the condition.

Since the signal OFF goes high due to the signal "d," the charging/transfer switcher 170 maintains the signal "e" at the low level. Therefore, a wasteful charging operation is terminated in a case in which the electronic timepiece 200 is not placed in the station 110. When the timer 142 has not yet finished counting, the processing returns to the step S102 and the signal "e" continues being output in order to continue executing charging. Until any command is sent from the electronic timepiece 200, or until the timer finishes counting, the determination executed by the step S112 is repeatedly executed. With this operation, as described above, whether either of the following two conditions occurs can be substantially determined.

(1) Although the electronic timepiece 200 is placed in the station 100, data transfer is not allowed due to an insufficient amount of electricity.

(2) The electronic timepiece 200 is not placed in the station 100.

When the station 100 which is in the idling state receives any command from the electronic timepiece 200, the decoder 155 decodes the received command (step S114).

When the command "com1" has been received, whether the charging start button 1031 was first pressed is determined (step S115).

More specifically, it is determined whether the charging/transfer switcher 170, which has received the signal "com1," received the signal CS before.

When the result of determination is affirmative, that is, when the charging/transfer switcher 170, which has received the signal "com1," received the signal CS before, the charging/transfer switcher 170 switches the signal "e" from the first charging signal to the second charging signal shown in FIG. 6. Then, the processing returns to the step S103 to continue charging.

As described above, charging is achieved while the signal "e" is being high, and data transfer is executed while the signal "e" is being low.

Since the duty cycle of the second charging signal, which is a charging signal used after the battery voltage of the secondary battery 220 exceeds the limit voltage, is set smaller than that of the first charging signal, which is a charging signal used when the battery voltage of the secondary battery 220 is less than the limit voltage, in other words, since a first effective charging time T1 serving as an effective charging time per unit time used when charging is achieved if the battery voltage (accumulated voltage) of the secondary battery 220 is lower than the limit voltage (reference voltage) specified in advance and a second effective charging time T2 serving as an effective charging time per unit time used when charging is achieved if the battery voltage is equal to or higher than the limit voltage are specified in advance so as to be T1>T2, when the battery voltage is equal to or higher than the limit voltage, a non-charging period is extended as shown by the second charging signal shown in FIG. 6, to reduce the consumed current, resultantly, power consumption, and the occlusion process is smoothly achieved to improve charging efficiency. As shown by a dotted line in FIG. 2(c), the heat of the electronic timepiece is reduced, and the deterioration of the electronic timepiece and the secondary battery due to the heat is prevented.

When the command "com1" has been received and the transfer start button 1032 was first pressed, data transfer is executed as shown by steps S121 to S123, described later.

When the command "com3" has been received, it is determined whether the charging start button 1031 was first pressed (step S117).

More specifically, it is determined whether the charging/transfer switcher 170, which has received the signal OFF due to the signal "com3," received the signal CS before.

When the result of determination is affirmative, that is, when the charging/transfer switcher 170, which has received the signal OFF due to the signal "com3," received the signal CS before, since the secondary battery 220 does not need to be charged any more, the processing circuit 130 shows an indication telling that full charging has been finished, on the display section 104, as shown by an indication A in FIG. 15 (step S118) to inform the user of the condition.

As a result, the charging/transfer switcher 170 maintains the signal "e" at the low level, and terminates a charging operation which is wasteful if executed.

When the command "com3" has been received and the transfer start button 1032 was first pressed, data transfer is executed in the steps S121 to S123, described later.

When the command "com2" has been received, since the duty cycle of the charging signal is to be increased, that is, since a charging state should be maintained by using the first charging signal shown in FIG. 6, it is determined whether the charging start button 1031 was first pressed (step S119).

More precisely, it is determined whether the charging/transfer switcher 170 received the signal CS before. Even if the transfer button 1032 was pressed, since it is necessary that charging be executed while the signal "e" is high and data transfer be achieved while the signal "e" is low, the charging/transfer switcher 170 does not need to switch the signal "e" or maintain it at the low level. In other words, even if the command "com2" is received, the charging/transfer switcher 170 substantially does not determine whether it received the signal CS before.

When the charging start button 1031 was first pressed, the processing returns to the step S102 again to maintain the charging state executed by using the first charging signal shown in FIG. 6.

Even if the command "com2" has been received, since data transfer is possible, when the transfer start button 1032 was first pressed, data transfer is achieved in the steps S121 to S123.

More specifically, digital data sent following any of the commands "com1" to "com3" is received by the receiving circuit 154, decoded by the decoder 155, and sent to the processing circuit 130 (step S121), and these processes are repeated until the transferred data finishes (step S122). When this transfer finishes, the processing circuit 130 shows an indication such as that illustrated in an indication D of FIG. 15 on the display section 104 (step S122), and an indication based on the received digital data on the display section 104.

Then, the processing circuit 130 uses a line not shown in FIG. 5 to stop sending the signal "e" to the charging/transfer switcher 130, and charging/data transfer is terminated. The processing may be returned to the step S102 to continue charging.

Figure 16:
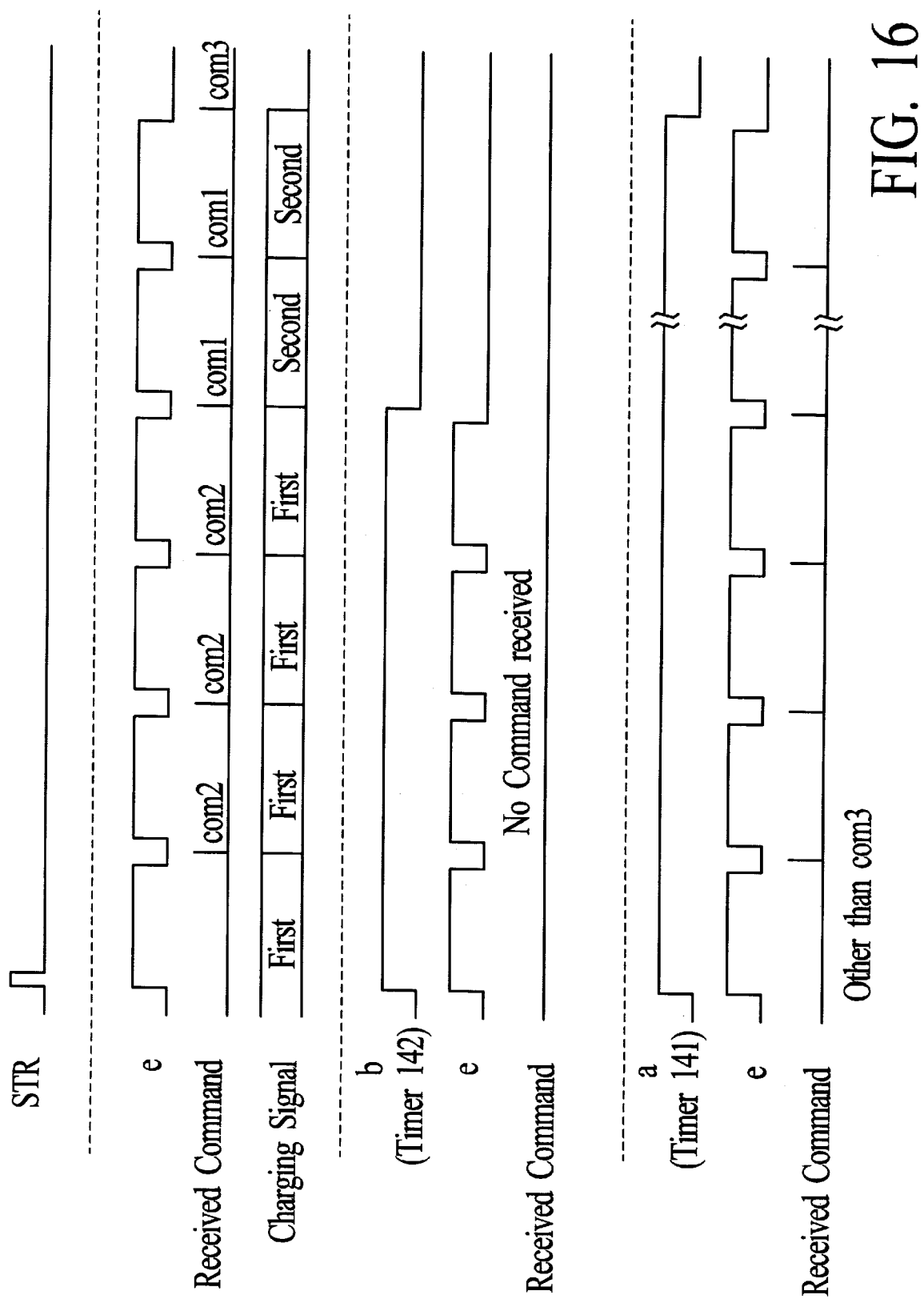
FIG. 16 is a timing chart showing specific operations executed between the station and the electronic timepiece.

According to the station 100 configured as described above, when the charging start button 1031 or the transfer start button 1032 is pressed, the pulse signal STR is output to start charging by the first charging signal (shown in FIG. 6) as shown in FIG. 16.

When the battery voltage of the secondary battery 220 is less than the limit voltage, the command "com2" is received as shown in FIG. 16. During a period when the signal "com2" is latched, charging achieved by the first charging signal (shown in FIG. 6) continues.

When the battery voltage of the secondary battery 220 exceeds the limit voltage, the command "com1" is received as shown in FIG. 16. During a period when the signal "com1" is latched, charging achieved by the second charging signal (shown in FIG. 6) is performed.

After the secondary battery 220 has been fully charged and the command "com3" is received, because the signal "e" is low, the charging operation is finished.

After the pulse signal STR is output, if no command is received until the signal "b" falls, that is, until the timer 142 finishes counting, since the command detector 160 sets the signal "d" high, the warning indication shown in the indication B of FIG. 15 is displayed on the display section 104, and the signal "e" is made low to terminate the charging operation, as shown in FIG. 16.

After the pulse signal STR is output, if only the command "com1" or "com2," other than the command "com3," is received until the signal "a" falls, that is, until the timer 141 finishes counting, the indication shown by the indication C of FIG. 15 is displayed on the display section 104, and the signal OFF goes high. Therefore, the signal "e" is set low to terminate the charging operation, as shown in FIG. 16.

Advantages in embodiment

As described above, in the present embodiment, the battery voltage is monitored, and after the battery voltage of the secondary battery reaches the limit voltage of the battery specified in advance, an effective charging time is reduced to positively achieve the occlusion process. Therefore, the reduction of charging efficiency is prevented. A wasteful current is reduced during charging to reduce power consumption. Heat is reduced and the deterioration of the electronic unit and an accumulator apparatus such as a lithium-ion secondary battery due to heat is suppressed.

Modified embodiments

First modified embodiment

In the foregoing embodiment, the duty cycle of the charging signal is changed. A charging signal may be specified, however, such that the first effective charging time T1 serving as an effective charging time per unit time used when charging is achieved if the battery voltage (accumulated voltage) of the secondary battery is lower than the reference voltage (limit voltage of the battery) specified in advance and the second effective charging time T2 serving as an effective charging time per unit time used when charging is achieved if the battery voltage (accumulated voltage) is equal to or higher than the reference voltage are specified in advance so as to satisfy an expression (1), and the ratio of an effective charging period and a non-charging period (progress idling period in the occlusion process) is appropriately specified according to the effective charging time T1, the effective charging time T2, and the comparison result of the accumulated voltage and the limit voltage (reference voltage) of the secondary battery.

$$T1 > T2 \qquad (1)$$

More specifically, it is also possible that the number of pulses per unit time is controlled with a constant duty cycle, instead of changing the duty cycle.

In other words, a charging signal may be specified such that a first pulse count P1 used in pulse charging per unit time in charging achieved if the battery voltage (accumulated voltage) of the secondary battery is lower than the reference voltage (limit voltage of the battery) specified in advance and a second pulse count P2 used in pulse charging per unit time in charging achieved if the battery voltage (accumulated voltage) is equal to or higher than the reference voltage are specified in advance so as to satisfy an expression (2), and the ratio of an effective charging period and a non-charging period (progress idling period in the occlusion process) is appropriately specified according to the first pulse count P1, the second pulse count P2, and the comparison result of the accumulated voltage and the limit voltage of the secondary battery.

$$P1 > P2 \qquad (2)$$

Second modified embodiment

In the above embodiments, pulse charging is executed before and after the battery voltage of the secondary battery reaches the limit voltage. It is also possible that constant-current charging or constant-voltage charging is executed until the battery voltage of the secondary battery reaches the limit voltage, as in the conventional way, and pulse charging is achieved after the battery voltage reaches the limit voltage.

Third modified embodiment

Figure 17:
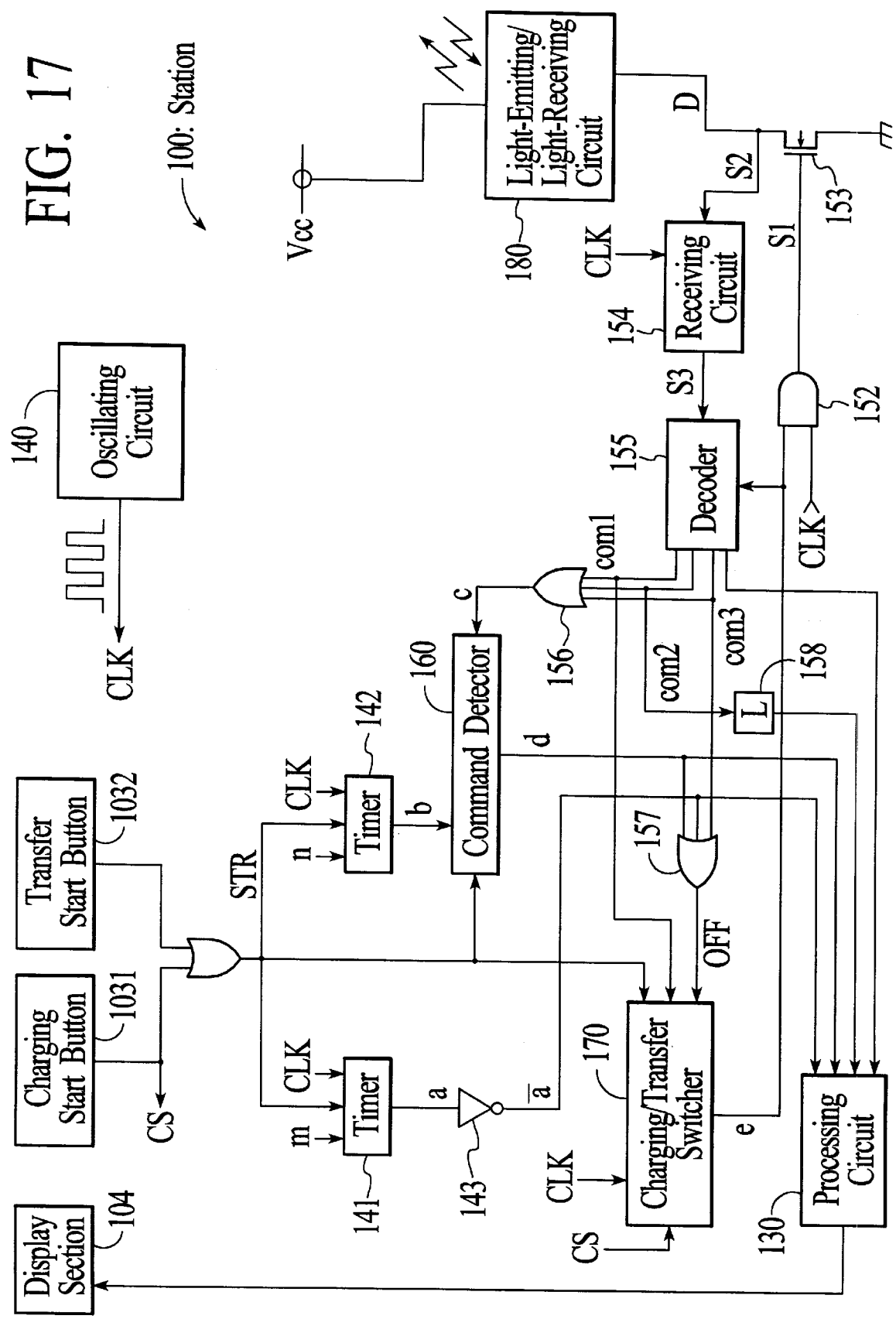
FIG. 17 is a block diagram showing the electric structure of a station according to a modified embodiment.
Figure 18:
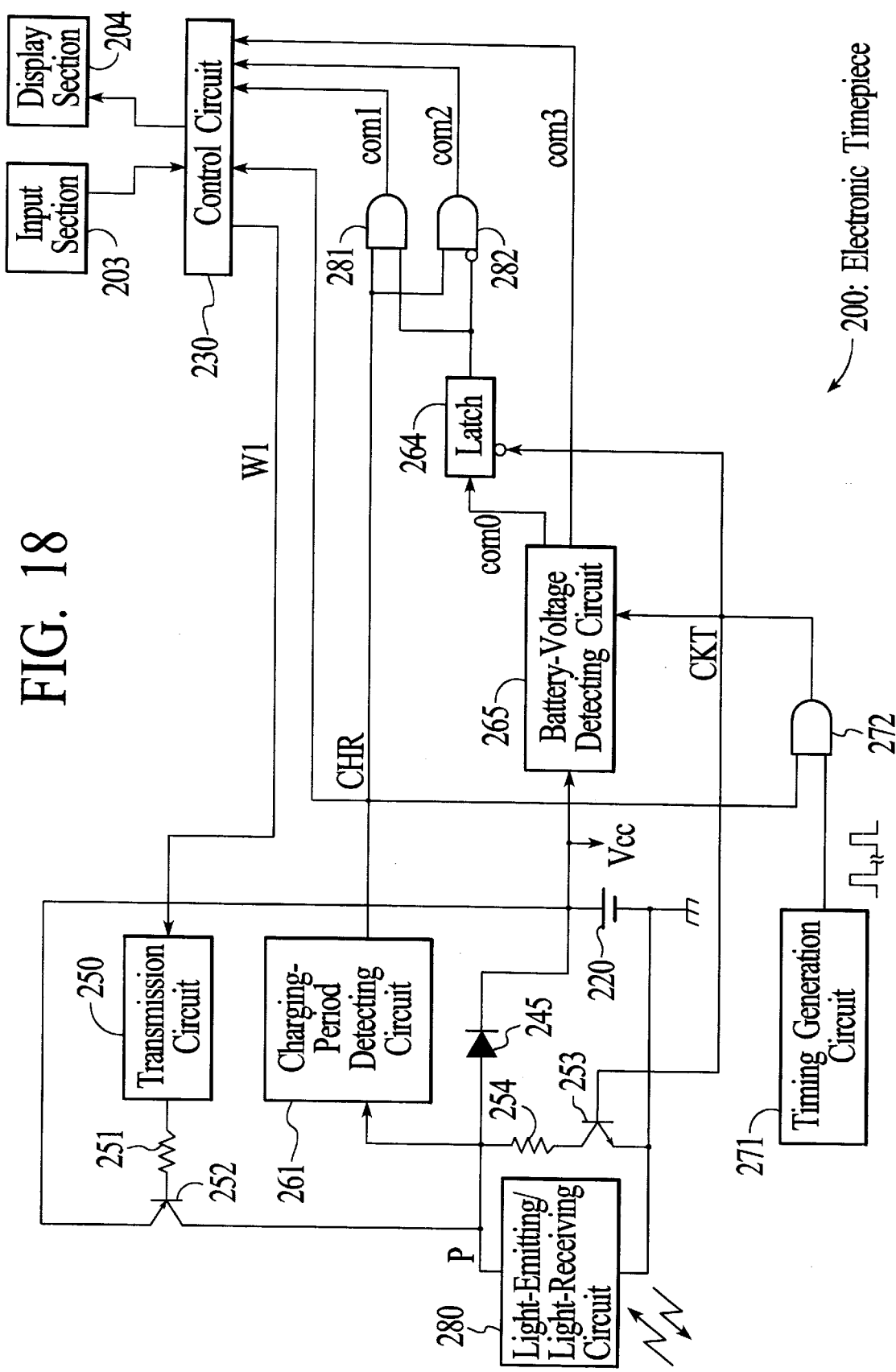
FIG. 18 is a block diagram showing the electric structure of an electronic timepiece according to the modified embodiment.

In the foregoing embodiments, charging and data transfer are achieved by the use of electromagnetic induction or electromagnetic coupling. They can be performed by optical coupling. FIG. 17 is a block diagram showing the electrical structure of a station 100 according to this modified embodiment, and FIG. 18 is a block diagram showing the electrical structure of an electronic timepiece 200 according to the modified embodiment. In the present modified embodiment, the station 100 has a light-emitting/light-receiving circuit 180 instead of the coil 110. The light-emitting/light-receiving circuit 180 has a light receiving device such as a photodiode and a light-emitting device such as a light-emitting diode. The electronic timepiece 200 has a light-emitting/light-receiving circuit 280 similar to the light-emitting/light-receiving circuit 180, instead of the coil 210.

In the present modified embodiment, during charging, the light-emitting/light-receiving circuit 180 emits light, the light-emitting/light-receiving circuit 280 receives the light, and electric power generated by the light-emitting/light-receiving circuit 280 is sent to the secondary battery 220. Transfer of data indicating the result of accumulated-voltage detection or the comparison result is achieved when light emitted by the light-emitting/light-receiving circuit 280 is received by the light-emitting/light-receiving circuit 180.

Fourth modified embodiment

In the foregoing embodiments, the electronic timepiece, which serves as a non-charging electronic unit, detects the voltage of the secondary battery and compares it with the limit voltage. The station can be provided with a comparison circuit for comparing the detected voltage with the limit voltage, or provided with both a voltage detecting circuit and the comparison circuit.

Figure 19:
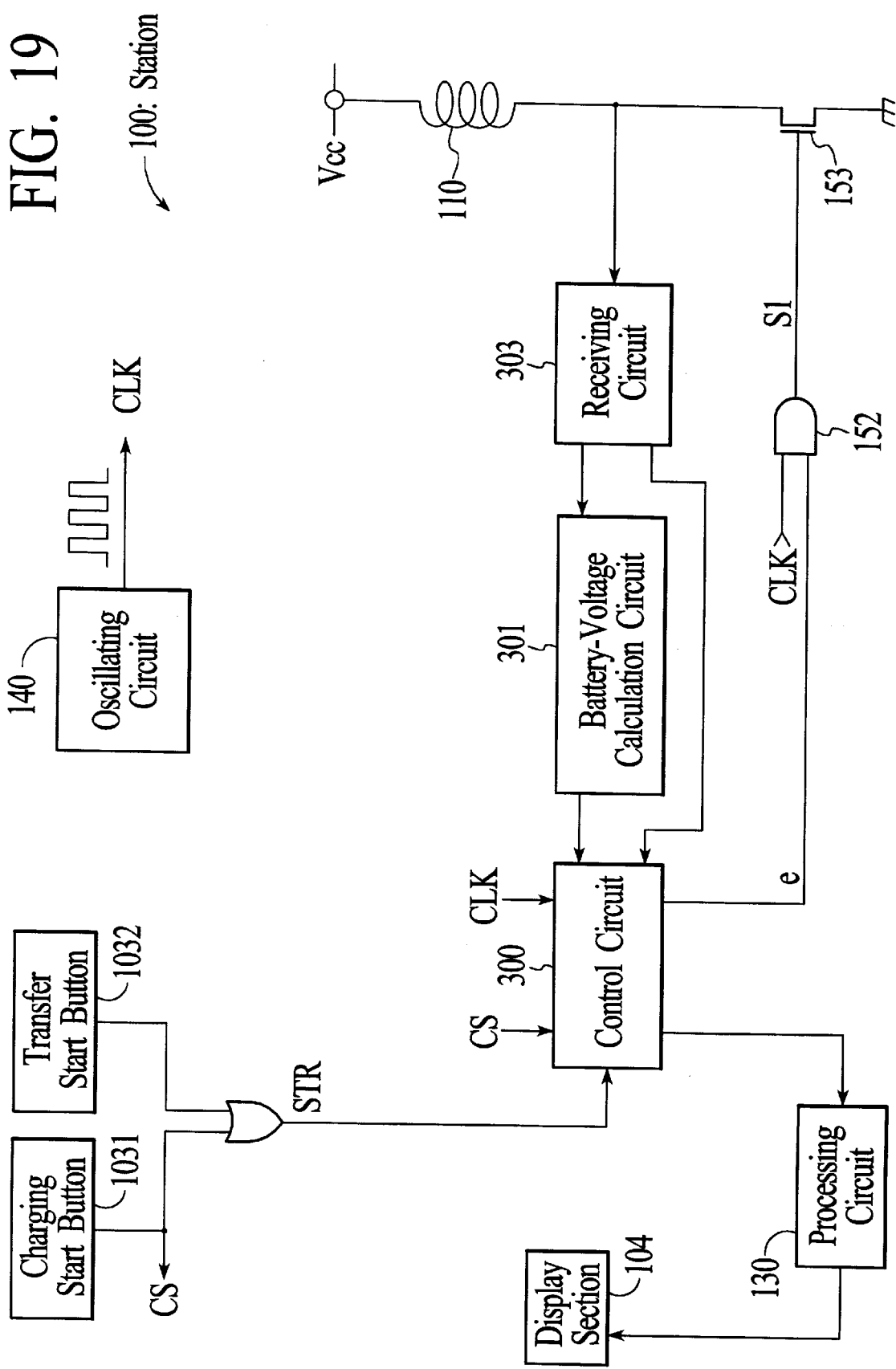
FIG. 19 is a block diagram showing the electric structure of a station according to another modified embodiment.
Figure 20:
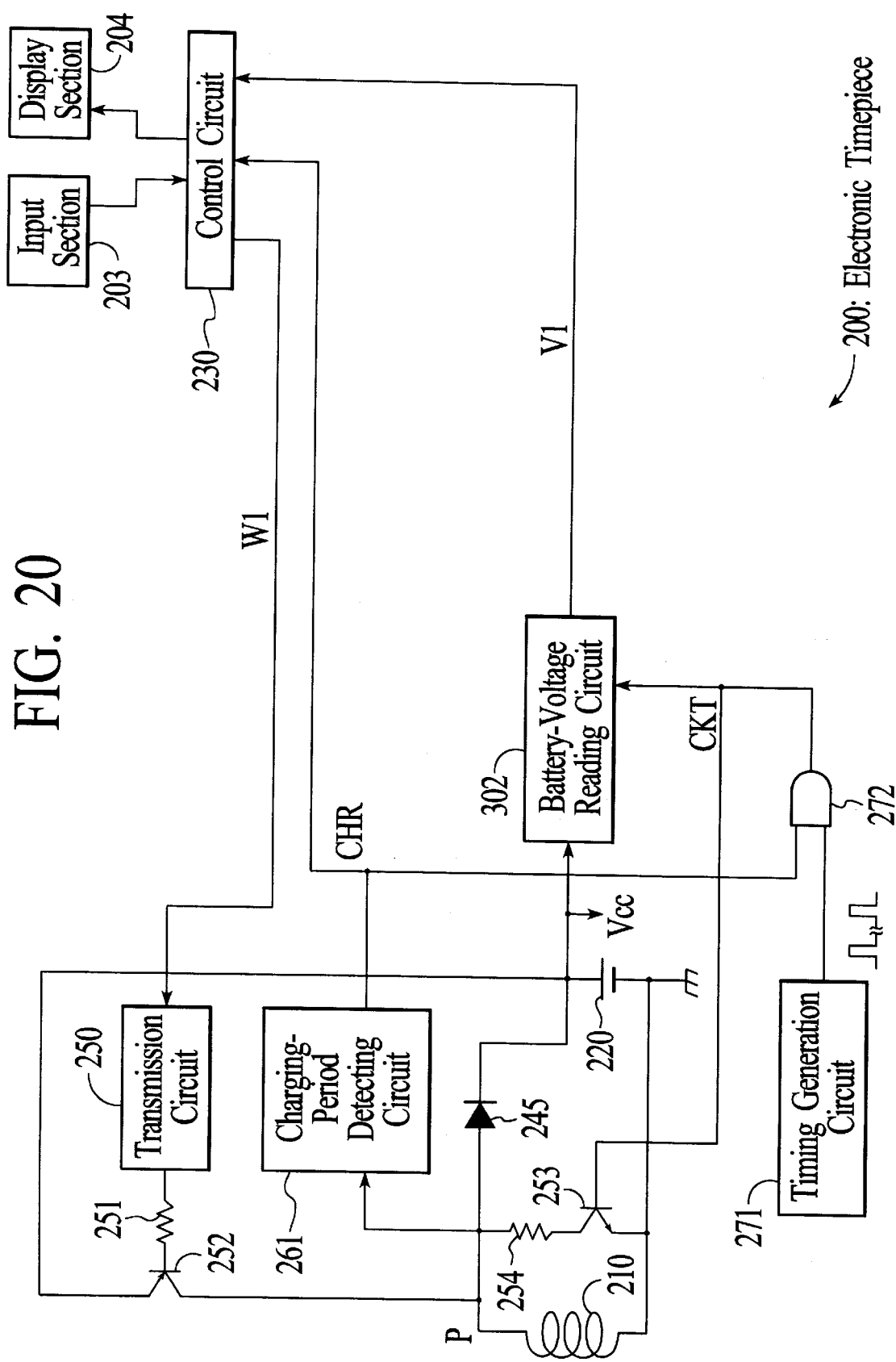
FIG. 20 is a block diagram showing the electric structure of an electronic timepiece according to the another modified embodiment.

FIG. 19 shows a station 100 according to a fourth modified embodiment, and FIG. 20 shows an electronic timepiece 200. In FIG. 19 and FIG. 20, the same symbols as those used in the foregoing embodiments are assigned to the elements used in common between the present modified embodiment and the foregoing embodiments, and a description thereof will be omitted. The electronic timepiece 200 according to the present modified embodiment has a structure similar to that of the electronic timepieces according to the foregoing embodiments, but includes a battery-voltage reading circuit 302 instead of the battery-voltage detecting circuit 265. The voltage of the secondary battery 220 is applied to the battery-voltage reading circuit 302.

Also in this electronic timepiece 200, when a signal is induced at the terminal P of the timepiece coil 210 by an external magnetic field and the signal CKT is low, the secondary battery 220 is charged. When a signal is induced at the terminal P by an external magnetic field and the signal CKT is low (the transistor 253 is off), the battery-voltage reading circuit 302 performs analog-digital conversion and sends the digital signal (battery-voltage signal) V1 corresponding to the terminal voltage of the secondary battery 220 to the control circuit 230. When a signal is not induced at the terminal P and the signal CHR is low, the battery-voltage signal and digital data are transferred.

The transferred battery-voltage signal V1 and digital data are received by the station coil 110 of the station 100 shown in FIG. 19. More specifically, the signal S2 induced at the terminal D of the station coil 110 by an external magnetic field is sent to a receiving circuit 303 during a period when the signal "e" is low. The receiving circuit 303 demodulates the signal S2 and decodes the result of demodulation. When the result of demodulation is a signal indicating medical information, the demodulated and decoded signal of the signal S2 is sent to a control circuit 300. The control circuit 300 controls the processing circuit 130 according to the decoded medical-information signal, and the processing circuit 130 controls the display contents of the display section 104 under the control of the control circuit 300.

When the battery-voltage signal V1 is received, the receiving circuit 303 sends the demodulated and decoded signal of the battery-voltage signal to a battery-voltage calculation circuit 301. The battery-voltage calculation circuit 301 calculates a battery voltage according to the decoded battery-voltage signal. The station 100 detects the battery voltage in this way. The battery-voltage calculation circuit 301 also compares the calculated battery voltage with the limit voltage and the full-charged voltage, and sends the comparison result of whether the battery voltage exceeds the limit voltage and the comparison result of whether the battery voltage exceeds the full-charged voltage to the control circuit 300. The control circuit 300 has a function equivalent to that of the combination of the timers 141 and 142, the command detector 160, and the charging/transfer switcher 170.

In other words, when the control circuit 300 starts receiving the pulse signal STR, the control circuit 300 outputs the first charging signal having a large duty cycle (20/21) as the signal "e." When a time sufficient for full charging elapses after the pulse signal STR is received, the control circuit 300 controls the processing circuit 130 so as to indicate on the display section 104 that full charging has been finished, and finishes sending the signal "e." When the battery-voltage calculation circuit 301 outputs the comparison result indicating that the secondary battery 220 has been fully charged, the control circuit 300 controls the processing circuit 130 so as to indicate on the display section 104 that full charging has been finished, and finishes sending the signal "e."

When the battery-voltage calculation circuit 301 outputs the comparison result indicating that the voltage of the secondary battery 220 exceeds the limit voltage, the control circuit 300 outputs the second charging signal having a small duty cycle (½) as the signal "e."

Even if a time sufficient for the remaining electricity of the secondary battery 220 to allow data transfer elapses if the battery-voltage calculation circuit 301 has not yet output the comparison result indicating that the voltage of the secondary battery 220 exceeds the limit voltage, the control circuit 300 controls the processing circuit 130 so as to indicate on the display section 104 that the electronic timepiece is not placed, and finishes sending the signal "e."

Fifth modified embodiment

In the foregoing embodiments, a charging state is determined according to the voltage of the secondary battery. The charging state can be determined according to the change of the charging current (average charging current shown in FIG. 2(a)) of the secondary battery. In this case, a charging-current detecting circuit for detecting the charging current of the secondary battery 220 when the transistor 253 is on needs to be provided, instead of the battery-voltage detecting circuit 265 shown in FIG. 11.

Sixth modified embodiment

In the foregoing embodiments, data transfer is achieved only in one direction from the electronic timepiece 200 to the station 100. Data transfer can of course be executed from the station 100 to the electronic timepiece 200. To transmit data to the electronic timepiece 200, the station 100 needs to modulate data to be transmitted, and the electronic timepiece 200 needs to perform demodulation correspondingly to the modulation method used. In this case, just a known technology needs to be applied to modulation and demodulation.

Seventh modified embodiment

In the above embodiments, the station 100 serves as an electronic unit and the electronic timepiece 200 serves as an electronic unit to be charged. A combination of an electronic unit and an electronic unit to be charged is not limited to the above case. The present invention can also be applied to units to be charged having secondary batteries, such as electric toothbrushes, electric shavers, portable telephones, personal handy-phones, mobile personal computers, PDAs (personal digital assistants (personal information terminals)) and charging units therefor.

What is claimed is:

1. A charging system including a first electronic unit for charging a second electronic unit having a charge accumulator which can be repeatedly charged, said charging system comprising:

a charging circuit for charging said charge accumulator according to a charging control signal; and a charge-control circuit adjusting said charging control signal in response to the accumulated voltage of said charge accumulator said charge-control circuit being effective for adjusting said charging control signal to have a first charge-transfer period T1 per unit time in response to the accumulated voltage of said charge accumulator being lower than a predetermined reference, and being effective for adjusting said charging control signal to have a second charge-transfer period T2 per unit time in response to the accumulated voltage of said charge accumulator not being lower than said predetermined reference voltage, wherein T1>T2.

2. The charging system according to claim 1, further including an accumulated-voltage detecting circuit for detecting the accumulated voltage of said charge accumulator.

3. The charging system according to claim 1, further including a comparison circuit for comparing the accumulated voltage of said charge accumulator with said predetermined reference voltage.

4. The charging system according to claim 1, further including a signal-receiving circuit for receiving a voltage monitoring signal, said voltage monitoring signal being one of the accumulated voltage detected at said charge accumulator and a comparison result of the accumulated voltage versus said predetermined reference voltage.

5. The charging system according to claim 4, wherein said signal-receiving circuit has a coil disposed oppositely to a coil provided in said second electronic unit, and said voltage monitoring signal is received by one of electromagnetic coupling and electromagnetic induction.

6. The charging system according to claim 4, wherein said signal-receiving circuit receives said voltage monitoring signal by the use of optical coupling.

7. The charging system according to claim 1, wherein said charge accumulator achieves pulse charging when the accumulated voltage is equal to or higher than said reference voltage.

8. A first electronic unit for charging a second electronic unit having a charge accumulator which can be repeatedly charged, comprising:

a charging circuit for applying pulse charging to said charge accumulator according to a charging control signal; and a charge-control circuit adjusting said charging control signal in response to the accumulated voltage of said charge accumulator, said charge-control circuit being effective for adjusting said charging control signal to have a first pulse count P1 per unit time in response to the accumulated voltage of said charge accumulator being lower than a predetermined reference voltage, and being effective for adjusting said charge control signal to have a second pulse count P2 per unit time in response to the accumulated voltage of said charge accumulator being not lower than said predetermined reference voltage, wherein P1>P2.

9. The charging system according to claim 1, wherein said charge accumulator is charged by pulse charging according to duty cycles defined by T1 and T2, whereby said charge-control circuit controls the duty cycle used in said pulse charging.

10. The charging system according to one of claim 1, wherein said predetermined reference voltage is the allowable maximum voltage applicable to said charge accumulator during charging.

11. A first electronic unit for charging a second electronic unit having a charge accumulator which can be repeatedly charged, comprising:

a charging circuit for charging said charge accumulator according to a charging control signal; and a charge-control circuit adjusting said charging control signal in response to the charging current of said charge accumulator, said charge-control circuit being effective for adjusting said charging control signal to have a first charge-transfer period T1 per unit time in response to the charging current of said charge accumulator being equal to or higher than a predetermined reference current, and being effective for adjusting said control signal to have a second charge transfer period T2 per unit time in response to the charging current of said charge accumulator being lower than said predetermined reference current, wherein T1>T2.

12. A first electronic unit for charging a second electronic unit having a charge accumulator which can be repeatedly charged, comprising:

a charging circuit for applying pulse charging to said charge accumulator according to a charging control signal; and a charge-control circuit adjusting said charging control signal in response to the charging current of said charge accumulator, said charge-control circuit being effective for adjusting said charging control signal to have a first pulse count P1 per unit time in response to the charging current of said charge accumulator being equal to or higher than a predetermined reference current, and being effective for adjusting said control signal to have a second pulse count P2 per unit time in response to the charging current of said charge accumulator being lower than said predetermined reference current, wherein P1>P2.

13. The charging system according to one of claim 1, wherein said second electronic unit is of a portable type.

14. The charging system of claim 1, wherein said charge accumulator is part of said second electronic device and said second electronic device includes an accumulated-voltage detecting and outputting section for detecting the accumulated voltage of said charge accumulator and for outputting an accumulated-voltage detection result.

15. The charging system according to claim 14, wherein said second electronic unit includes a first coil disposed oppositely to a second coil provided in said first electronic unit; and includes a transmission section for transmitting said accumulated-voltage detection result by one of electromagnetic coupling and electromagnetic induction.

16. The charging system according to claim 14, wherein said second electronic unit includes a transmission section for transmitting said accumulated-voltage detection result by the use of optical coupling.

17. The charging system of claim 1, wherein said second electronic unit includes said charge accumulator, an accumulated-voltage detecting section for detecting the accumulated voltage of said charge accumulator, and a comparison-result outputting section for comparing the accumulated voltage detected by said accumulated-voltage detecting section with said predetermined reference voltage and for outputting the result of said comparison.

18. The charging system according to claim 17, further including a transmission section for transmitting the result of said comparison by the use of one of electromagnetic coupling and electromagnetic induction by using a first coil disposed oppositely to a second coil provided in said first electronic unit.

19. The charging system according to claim 17, further including a transmission section for transmitting the result of said comparison by the use of optical coupling.

20. An electronic unit to be charged according to one of claim 18, wherein said second electronic unit is of a portable type.

21. A control method for an electronic device for charging an apparatus to be charged having an accumulator unit which can be repeatedly charged, comprising the steps of:

applying charge to said charge accumulator unit in first pulse cycles having a first charge-transfer period T1 per unit time in response to the accumulated voltage of said charge accumulator unit being lower than a predetermined reference voltage, and applying charge to said charge accumulator unit in second pulse cycles having a second charge-transfer period T2 per unit time in response to the accumulated voltage of said charge accumulator unit being equal to or higher than said predetermined reference voltage, wherein T1>T2.

* * * * *

UNITED STATES PATENT AND TRADEMARK OFFICE
CERTIFICATE OF CORRECTION

PATENT NO.    : 6,313,612 B1
DATED         : November 6, 2001
INVENTOR(S)   : Katsuyuki Honda et al.

It is certified that error appears in the above-identified patent and that said Letters Patent is hereby corrected as shown below:

<u>Title page,</u>
Item [54], Title, change "ELECTRONIC DEVICE, ELECTRONIC DEVICE TO BE CHARGED AND METHOD OF CONTROLLING ELECTRONIC DEVICES" to -- ELECTRONIC UNIT, ELECTRONIC UNIT TO BE CHARGED, AND CONTROL METHOD FOR ELECTRONIC UNIT --.
Item [56], References Cited, FOREIGN PATENT DOCUMENTS, please change "0 580 350 A2 1/1994 (EP)" to -- 0 580 351 A2 (EP) --

<u>Column 20,</u>
Line 14, after "accumulator" insert -- , --
Line 19, after "reference" insert -- voltage --

Signed and Sealed this

Fifteenth Day of October, 2002

Attest:

Attesting Officer

JAMES E. ROGAN
*Director of the United States Patent and Trademark Office*